US011127097B2

(12) United States Patent
Liu et al.

(10) Patent No.: US 11,127,097 B2
(45) Date of Patent: Sep. 21, 2021

(54) METHOD, APPARATUS, AND SYSTEM FOR COPYRIGHT RIGHTS DEFENSE DETECTION

(71) Applicant: HUAWEI TECHNOLOGIES CO., LTD., Shenzhen (CN)

(72) Inventors: Deqian Liu, Shenzhen (CN); Junrong Wen, Shenzhen (CN); Pu Zhang, Shenzhen (CN); Yixin Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 273 days.

(21) Appl. No.: 16/388,881

(22) Filed: Apr. 19, 2019

(65) Prior Publication Data
US 2019/0251648 A1    Aug. 15, 2019

Related U.S. Application Data

(63) Continuation of application No. PCT/CN2017/091277, filed on Jun. 30, 2017.

(30) Foreign Application Priority Data

Oct. 19, 2016   (CN) .......................... 201610913814.3

(51) Int. Cl.
*G06F 16/27*   (2019.01)
*G06F 21/16*   (2013.01)
(Continued)

(52) U.S. Cl.
CPC ........... *G06Q 50/184* (2013.01); *G06F 16/27* (2019.01); *G06F 21/16* (2013.01); *H04N 21/44236* (2013.01); *G06F 2221/074* (2013.01)

(58) Field of Classification Search
None
See application file for complete search history.

(56) References Cited

U.S. PATENT DOCUMENTS

2010/0023491 A1   1/2010  Huang
2011/0264767 A1  10/2011  Liu et al.
(Continued)

FOREIGN PATENT DOCUMENTS

| CN | 101046835 A | 10/2007 |
|---|---|---|
| CN | 101282330 A | 10/2008 |

(Continued)

OTHER PUBLICATIONS

XP055543368 Jeff Herbert et al.,"A Novel Method for Decentralised Peer-to-Peer Software License Validation Using Cryptocurrency Blockchain Technology",Proceedings of the 38th Australasian Computer Science Conference (ACSC 2015), Sydney, Australia,Jan. 27-30, 2015,total 9 pages.

*Primary Examiner* — Sarah M Monfeldt
*Assistant Examiner* — Michael J. Monaghan
(74) *Attorney, Agent, or Firm* — Maier & Maier, PLLC

(57) ABSTRACT

A method, an apparatus, and a system for copyright rights defense detection are provided. The method includes: sending a metadata query request to a copyright handling apparatus; receiving a metadata query response that is sent by the copyright handling apparatus and that includes feature metadata; obtaining a rights-to-be-defended content feature corresponding to the feature metadata from a feature database; sending a license query request to a license processing apparatus; receiving a license query response that is sent by the license processing apparatus and that includes license information; and performing rights defense detection for a copyright based on the obtained rights-to-be-defended content feature and the license information. Rights defense (Continued)

detection can be performed for a copyright by any rights defense detection service apparatus.

17 Claims, 17 Drawing Sheets

(51) Int. Cl.
*G06Q 50/18* (2012.01)
*H04N 21/442* (2011.01)

(56) References Cited

U.S. PATENT DOCUMENTS

| 2014/0115716 A1* | 4/2014 | Schmelzer ............ G06F 16/683 |
| | | 726/26 |
| 2016/0300234 A1* | 10/2016 | Moss-Pultz ........... H04L 9/3263 |
| 2017/0116693 A1* | 4/2017 | Rae ....................... H04L 9/3236 |
| 2017/0134161 A1* | 5/2017 | Goeringer ............ G06Q 20/065 |
| 2017/0214522 A1* | 7/2017 | Code ................... H04L 63/0861 |
| 2018/0068091 A1* | 3/2018 | Gaidar .................... G06F 21/16 |

FOREIGN PATENT DOCUMENTS

| CN | 101714195 A | 5/2010 |
| CN | 101771671 A | 7/2010 |
| CN | 104254004 A | 12/2014 |
| CN | 105303069 A | 2/2016 |
| CN | 105704515 A | 6/2016 |
| GB | 2514716 A | 12/2014 |
| KR | 101628005 B1 | 6/2016 |

\* cited by examiner

METHOD, APPARATUS, AND SYSTEM FOR COPYRIGHT RIGHTS DEFENSE DETECTION

CROSS-REFERENCE TO RELATED APPLICATIONS

This application is a continuation of International Application No. PCT/CN2017/091277, filed on Jun. 30, 2017, which claims priority to Chinese Patent Application No. 201610913814.3, filed on Oct. 19, 2016. The disclosures of the aforementioned applications are hereby incorporated by reference in their entireties.

TECHNICAL FIELD

This application relates to the field of digital rights management technologies, and in particular, to a method, an apparatus, and a system for copyright rights defense detection in a peer-to-peer network.

BACKGROUND

With popularization of computers and rapid development of the Internet, digital content (such as audios, images, and videos) is often illegally copied and spread without permissions. The copyright protection requirements are increasingly urgent. Currently, the following three technologies are used for digital content copyright protection: a digital rights management (DRM) technology, a digital watermarking technology, and a content feature detection technology. The digital watermarking technology and the content feature detection technology are copyright protection methods for post-event rights defense. In the methods, infringing digital content is detected to find an infringement act. A copyright owner can file a lawsuit against an illegal infringement act by using the detected infringing digital content as a proof, to protect interests of the copyright owner.

The content feature detection technology generally includes three parts: content feature extraction, feature database, and content feature matching. The content feature detection technology extracts a feature from digital content, and the extracted feature can be used to distinguish between an illegal copy of the digital content and other digital content. Therefore, a purpose of copyright protection is achieved by searching to-be-verified digital content for the extracted feature and further verifying whether the digital content is infringing content.

An existing copyright rights defense system that is based on the content feature detection technology generally includes one centralized copyright rights defense system background and a plurality of rights defense detection applications corresponding to different content distributors. The copyright rights defense system background is responsible for collecting a content feature of rights-to-be-defended digital content and storing the content feature in a centralized feature database (such as a database). A rights defense detection application obtains to-be-matched digital content from a corresponding content distributor (such as a video website), and extracts and sends a content feature to the copyright rights defense system background. A content feature matching service performs a query of matching between the to-be-matched content feature and the rights-to-be-defended content feature in the feature database, determines, based on a matching result, whether the digital content distributed by the distributor is infringing, and if an infringement act occurs, records a rights defense detection report and uses the report as a proof for a subsequent rights defense.

Although the existing copyright rights defense system that is based on the content feature detection technology can perform a copyright rights defense by matching a feature of distributed content, a centralized architecture of the existing copyright rights defense system causes a limited coverage range of a distribution channel. The following disadvantages currently exist: A content feature of to-be-matched digital content can be collected only through cooperation with a content distribution channel or targeted deployment of a rights defense detection application. Therefore, an infringement act of an illegal content distributor cannot be detected, and a detection rate and a detection effect for a copyright rights defense are reduced.

SUMMARY

Embodiments of this application provide a method, an apparatus, and a system for copyright rights defense detection in a P2P network. The system includes one or more rights defense detection service apparatuses, one or more rights defense detection clients, and one or more rights defense processing apparatuses and a blockchain processing apparatus corresponding to the one or more rights defense processing apparatuses. In a copyright rights defense detection process, a rights defense detection service apparatus obtains feature metadata from a blockchain processing apparatus by using a rights defense processing apparatus, and downloads a rights-to-be-defended content feature from a distributed feature database. In addition, the rights defense detection service apparatus obtains license information of rights-to-be-defended data content from a blockchain processing apparatus by using a license processing apparatus, and then the rights defense detection service apparatus implements the rights defense detection process. Because the rights defense detection service apparatus does not belong to any content distributor, the rights defense detection service apparatus can perform detection on content distributed by all content distributors, thereby improving a detection rate and a detection effect for a copyright rights defense.

According to a first aspect, an embodiment of the present invention provides a copyright rights defense detection method. In a P2P network, there is one or more rights defense detection service apparatuses, one or more copyright handling apparatuses and a blockchain processing apparatus in a one-to-one correspondence with the copyright handling apparatus, and one or more license processing apparatuses and a blockchain processing apparatus in a one-to-one correspondence with the license processing apparatus. The method includes: A rights defense detection service apparatus sends a metadata query request including a detection task transaction identifier to a copyright handling apparatus; the copyright handling apparatus obtains, based on the detection task transaction identifier, corresponding feature metadata from a blockchain stored in a corresponding blockchain processing apparatus, and sends a metadata query response including the feature metadata to the rights defense detection service apparatus; after receiving the feature metadata, the rights defense detection service apparatus obtains a content feature corresponding to the feature metadata from a distributed feature database, where the content feature is a rights-to-be-defended content feature. The rights defense detection service apparatus further sends a license query request including the detection task transaction identifier to a license processing apparatus; the license processing apparatus queries and obtains, based on the detection task transaction identifier, license information from a blockchain stored in a blockchain processing apparatus, and sends a license query response including the license information to the rights defense detection service apparatus; and rights defense detection service apparatus receives the license information. The rights defense detection service apparatus performs rights defense detection for a copyright based on the obtained rights-to-be-defended content feature and the license information. The feature metadata and the license information are both stored in blockchains. Therefore, the rights defense detection service apparatus can conveniently and securely query the feature metadata and the license information from the blockchains, so that rights defense detection can be performed for a copyright by any rights defense detection service apparatus.

In a possible design, a specific process in which rights defense detection is performed for a copyright based on the obtained rights-to-be-defended content feature and the license information may include: The rights defense detection service apparatus receives a detection task request that is sent by a rights defense detection client and that includes a content distribution identifier; the rights defense detection service apparatus allocates a rights defense detection task for the rights defense detection client based on the content distribution identifier, and sends a detection task response to the rights defense detection client, where the detection task response includes a task allocation result, a sequence number of a to-be-matched content feature segment, and a segment size; and after the rights defense detection client extracts a content feature segment, the rights defense detection service apparatus receives a content feature reporting request sent by the rights defense detection client, where the content feature reporting request includes the content distribution identifier, a content feature extraction result, the sequence number of the to-be-matched content feature segment, and the to-be-matched content feature segment. Further, the rights defense detection service apparatus performs matching based on the to-be-matched content feature segment and the rights-to-be-defended content feature, to obtain the matching result; and performs rights defense detection for a copyright corresponding to a to-be-matched content feature whose matching result indicates a success. For a same piece of digital content, the rights defense detection service apparatus may assign a plurality of rights defense detection clients to extract content features from different parts of the digital content in parallel, so that content feature extraction efficiency and rights defense detection efficiency are improved. The rights defense detection client sends the extracted to-be-matched content feature to the rights defense detection service apparatus. The rights defense detection service apparatus performs matching between the to-be-matched content feature and the rights-to-be-defended content feature, and determines a license status of a successfully matched content feature, to further determine whether a copyright of the to-be-matched digital content is infringing.

In a possible design, a specific process in which the rights defense detection service apparatus allocates a rights defense detection task to the rights defense detection client based on the content distribution identifier may include: The rights defense detection service apparatus determines whether the content distribution identifier exists, and if the content distribution identifier does not exist, sets the sequence number of the to-be-matched content feature segment to 1, sets the segment size according to a preconfigured rule, and sets the task allocation result to successful; or if the content distribution identifier exists and a corresponding detection task state is in-progress, queries a maximum sequence number of an allocated to-be-matched content feature segment based on the content distribution identifier, sets the sequence number of the to-be-matched content feature segment to be equal to the maximum sequence number of the allocated to-be-matched content feature segment+1, sets the segment size according to a preconfigured rule, and sets the task allocation result to successful; or if the content distribution identifier in the detection task request exists and a corresponding detection task state is ended, sets the task allocation result to ended. For a same piece of digital content, the rights defense detection service apparatus may assign a plurality of rights defense detection clients to extract content features from different parts of the digital content in parallel, so that content feature extraction efficiency and rights defense detection efficiency are further improved.

In a possible design, a specific process in which the rights defense detection service apparatus performs rights defense detection for a copyright based on the obtained rights-to-be-defended content feature and the license information may include: The rights defense detection service apparatus receives a detection report submission request from the rights defense detection client, where the detection report submission request includes an address of a detection report asset owner, a detection report submission time, a successfully matched content feature, and a content feature matching degree; and performs rights defense detection for a copyright corresponding to a to-be-matched content feature whose matching result indicates a success.

In a possible design, that the rights defense detection service apparatus performs rights defense detection for a copyright corresponding to a to-be-matched content feature whose matching result indicates a success specifically includes: The rights defense detection service apparatus obtains, based on a stored association relationship between a content feature and a content feature transaction identifier, a content feature transaction identifier corresponding to the to-be-matched content feature whose matching result indicates a success; obtains, based on a stored association relationship between a content feature transaction identifier and a copyright transaction identifier, a copyright transaction identifier corresponding to the content feature transaction identifier; and if license information corresponding to the copyright transaction identifier is empty, determines, based on a stored correspondence between a copyright transaction identifier and license information, that a rights defense detection result is "infringing"; or if license information corresponding to the copyright transaction ID is not empty, determines whether a distribution constraint of a license included in the license information is valid; and if the distribution constraint of the license is invalid, determines that a rights defense detection result is "infringing", or if the distribution constraint of the license is valid, determines that a rights defense detection result is "non-infringing". This process further implements the rights defense detection process, so that it is determined whether a right of a copyright needs to be defended.

In a possible design, the method further includes: The rights defense detection service apparatus sends a detection report submission request to a rights defense processing apparatus, where the detection report submission request includes an address of a detection report asset owner, a detection report submission time, a content distribution identifier, a content feature transaction identifier of infringed content, the detection task transaction identifier, and a content feature matching degree; after receiving the detection report submission request and successfully verifying the detection report submission request, the rights defense processing apparatus constructs a detection report transaction based on the detection report submission request, sets each of a transaction identifier of a transaction currently bearing an asset and a signature of an asset owner that are in input content in the detection report transaction to be empty, sets an address in output content in the detection report transaction to the address of the detection report asset owner, and sets asset data in the output content in the detection report transaction to the detection report submission time, the content distribution identifier, the content feature transaction identifier of infringed content, the detection task transaction identifier, and the content feature matching degree; and the rights defense processing apparatus sends the detection report transaction to a blockchain in a blockchain processing apparatus for storage. By storing the detection report transaction by using the rights defense processing apparatus, a detection result is recorded in a blockchain, to ensure that the detection result cannot be tampered with or queried at discrete.

In a possible design, that a rights defense detection service apparatus sends a metadata query request to a copyright handling apparatus specifically includes: The rights defense detection service apparatus sends a detection task query request including the detection task transaction identifier to a rights defense processing apparatus; and the rights defense detection service apparatus receives a detection task query response that is sent by the rights defense processing apparatus and that includes one or more detection task transactions, where the detection task transaction is obtained by the rights defense processing apparatus based on the detection task transaction identifier from a blockchain stored in a blockchain processing apparatus; and sends the metadata query request to the copyright handling apparatus for each detection task transaction. The rights defense detection service apparatus obtains a detection task from a blockchain in a blockchain processing apparatus by using the rights defense processing apparatus, so that any rights defense detection service apparatus can obtain a rights defense task, and this is conducive to increasing a degree of copyright rights defense detection participation.

In a possible design, that the rights defense detection service apparatus performs rights defense detection for a copyright based on the obtained rights-to-be-defended content feature and the license information specifically includes: obtaining to-be-matched feature metadata from a blockchain processing apparatus corresponding to the copyright handling apparatus; obtaining a to-be-matched content feature from the feature database based on the to-be-matched feature metadata; performing matching based on a to-be-matched content feature segment and the rights-to-be-defended content feature, to obtain a matching result; and when the matching result indicates a success, determining whether a copyright transaction identifier corresponding to the to-be-matched feature metadata is the same as a copyright transaction identifier corresponding to rights-to-be-defended feature metadata; and if the copyright transaction identifier corresponding to the to-be-matched feature metadata is the same as the copyright transaction identifier corresponding to the rights-to-be-defended feature metadata, determining that a rights defense detection result is "infringing", or if the copyright transaction identifier corresponding to the to-be-matched feature metadata is different from the copyright transaction identifier corresponding to the rights-to-be-defended feature metadata, determining that a rights defense detection result is "non-infringing".

According to a second aspect, an embodiment of the present invention provides a copyright rights defense detection system, including one or more rights defense detection service apparatuses, one or more copyright handling apparatuses, one or more license processing apparatuses, and one or more blockchain processing apparatuses. The rights defense detection service apparatus has a function of implementing actual behavior of the rights defense detection service apparatus in the foregoing method. The copyright handling apparatus has a function of implementing actual behavior of the copyright handling apparatus in the foregoing method. The license processing apparatus has a function of implementing actual behavior of the license processing apparatus in the foregoing method. The blockchain processing apparatus has a function of implementing actual behavior of the blockchain processing apparatus in the foregoing method. The function may be implemented by using hardware, and may also be implemented by hardware by executing corresponding software. The hardware or the software includes one or more modules corresponding to the foregoing function.

In a copyright rights defense detection system in a possible design, the copyright rights defense detection system further includes a rights defense processing apparatus, having a function of implementing actual behavior of the rights defense processing apparatus in the foregoing method. The function may be implemented by using hardware, and may also be implemented by hardware by executing corresponding software. The hardware or the software includes one or more modules corresponding to the foregoing function.

In a possible design, a structure of the rights defense detection service apparatus includes a processor and a memory. The memory is configured to store application program code that supports the rights defense detection service apparatus in executing the foregoing method. The processor is configured to execute an application program stored in the memory. The rights defense detection service apparatus may further include a communications interface, used by the rights defense detection service apparatus to communicate with other devices or other communications networks. The copyright handling apparatus, license processing apparatus, blockchain processing apparatus, and rights defense processing apparatus each have similar structures.

According to a third aspect, an embodiment of the present invention provides a rights defense detection client. The rights defense detection client has a function of implementing actual behavior of the rights defense detection client in the foregoing method. A copyright management client has a function of implementing actual behavior of a copyright management client in the foregoing method. The function may be implemented by using hardware, and may also be implemented by hardware by executing corresponding software. The hardware or the software includes one or more modules corresponding to the foregoing function.

In a possible design, a structure of the rights defense detection client includes a processor and a memory. The memory is configured to store application program code that supports the rights defense detection client in executing the foregoing method. The processor is configured to execute an application program stored in the memory. The rights defense detection client may further include a communications interface, used by the rights defense detection client to communicate with other devices or other communications networks. A copyright management client has a similar structure.

According to a fourth aspect, an embodiment of the present invention provides a computer storage medium, configured to store a computer software instruction used by the rights defense detection service apparatus, the copyright handling apparatus, the license processing apparatus, the blockchain processing apparatus, or the rights defense processing apparatus described above. The computer software instruction includes a program designed for the rights defense detection service apparatus, the copyright handling apparatus, the license processing apparatus, the blockchain processing apparatus, or the rights defense processing apparatus for executing each of the foregoing aspects.

According to a fifth aspect, an embodiment of the present invention provides a computer storage medium, configured to store a computer software instruction used by the rights defense detection client or the copyright management client described above. The computer software instruction includes a program designed for the rights defense detection client or the copyright management client for executing each of the foregoing aspects.

According to a sixth aspect, an embodiment of the present invention provides a copyright rights defense detection method. After a copyright management client registers a content feature with a feature database, the copyright management client sends a content feature registration request to a copyright handling apparatus. This solution includes:

The copyright handling apparatus receives the content feature registration request sent by the copyright management client, where the content feature registration request includes an address of a content feature owner, a copyright transaction ID, a private key signature of a copyright owner, and feature metadata. The copyright handling apparatus verifies the content feature registration request, and if the verification fails, sends a content feature registration response for the failure to the copyright management client; or if the verification succeeds, constructs a content feature transaction based on the content feature registration request, sets a transaction identifier of a transaction currently bearing an asset and a signature of an asset owner that are in input content included in the content feature transaction respectively to a copyright transaction identifier and a private key signature of a copyright owner, sets an address in output content included in the content feature transaction to the address of the content feature owner, and sets asset data in the content feature transaction to the feature metadata. Because the copyright handling apparatus verifies the content feature registration request, the content feature transaction registered in a blockchain is correct and valid. In addition, because the content feature transaction is registered in the blockchain, the content feature transaction cannot be tampered with and a device in any network can obtain the content feature transaction. Further, through coordination between distributed rights defense detection services and rights defense detection clients worldwide, comprehensive rights defense detection coverage is implemented for content distributed by content distribution channels on the Internet, including rights defense detection for legal and illegal content distribution channels.

In a possible design, a process in which the copyright handling apparatus verifies the content feature registration request includes: The copyright handling apparatus obtains a copyright transaction corresponding to the foregoing copyright transaction identifier, where if there is no copyright transaction corresponding to the foregoing copyright transaction identifier in a blockchain, the copyright handling apparatus fails to obtain the copyright transaction and the verification fails; and the copyright handling apparatus verifies, by using the address included in the output content in the obtained copyright transaction, whether the private key signature of the copyright owner is valid, where if a verification result is invalid, the verification fails.

According to a seventh aspect, an embodiment of the present invention provides a copyright rights defense detection method, including: A rights defense processing apparatus receives a detection task release request sent by a copyright management client, verifies the detection task release request, and if the verification fails, sends a detection task release response to the copyright management client; or if the verification succeeds, constructs a detection task transaction based on the detection task release request, sets a transaction identifier of a transaction currently bearing an asset and a signature of an asset owner that are in input content included in the detection task transaction respectively to a copyright transaction identifier and a private key signature of a copyright owner, sets an address in output content to an address of a detection task owner, and sets asset data in the output content to detection task information, where the detection task information includes detection task execution information and a detection task release time, and the detection task information may further include a rights defense detection incentive policy. Because the rights defense processing apparatus verifies the detection task release request, the detection task transaction registered in a blockchain is correct and valid. In addition, because the detection task transaction is registered in the blockchain, the detection task transaction cannot be tampered with and a device in any network can obtain the detection task transaction. Further, through coordination between distributed rights defense detection services and rights defense detection clients worldwide, comprehensive rights defense detection coverage is implemented for content distributed by content distribution channels on the Internet, including rights defense detection for legal and illegal content distribution channels.

In a possible design, that a rights defense processing apparatus verifies the detection task release request specifically includes: The rights defense processing apparatus obtains a copyright transaction corresponding to the copyright transaction identifier from a blockchain stored in a blockchain processing apparatus corresponding to the rights defense processing apparatus, and if there is no copyright transaction corresponding to the copyright transaction identifier in the blockchain, the rights defense processing apparatus fails to obtain the copyright transaction and the verification fails. The rights defense processing apparatus verifies, by using the address included in the output content in the obtained copyright transaction, whether the private key signature of the copyright owner is valid, and if a verification result is invalid, the verification fails.

According to an eighth aspect, an embodiment of the present invention provides a copyright rights defense detection method, including: A rights defense detection service apparatus sends a feature transaction query request to a copyright handling apparatus, and the copyright handling apparatus receives a feature transaction query response including one or more content feature transactions, and sends the feature transaction query response to the rights defense detection service apparatus. The rights defense detection service apparatus receives the feature transaction query response and stores the one or more to-be-matched content feature transactions. The rights defense detection service apparatus downloads a to-be-matched content feature from a feature database based on to-be-matched feature metadata. The rights defense detection service apparatus performs a query of infringement matching between the to-be-matched content feature and a stored rights-to-be-defended content feature. This process occurs after digital content copyright registration. The rights defense detection service apparatus can perform detection on current latest digital content that has a copyright registered, to determine whether the registered digital content is an infringing production.

In a possible design, that the rights defense detection service apparatus performs a query of infringement matching between the to-be-matched content feature and a stored rights-to-be-defended content feature may include: The rights defense detection service apparatus performs matching by using the to-be-matched content feature and the rights-to-be-defended content feature. If a degree of a similarity between the to-be-matched content feature and each content feature in the stored rights-to-be-defended content feature is lower than a foregoing specified threshold, the matching fails. If the to-be-matched content feature is the same as one content feature in the stored rights-to-be-defended content feature, or a degree of a similarity between the to-be-matched content feature and one content feature in the stored rights-to-be-defended content feature is greater than the specified threshold, the matching succeeds. After the matching succeeds, the rights defense detection service apparatus determines feature metadata corresponding to a successfully matched rights-to-be-defended content feature based on a stored correspondence between a rights-to-be-defended content feature and feature metadata, and determines a copyright transaction identifier corresponding to the rights-to-be-defended feature metadata based on a stored correspondence between feature metadata and a copyright transaction identifier. The rights defense detection service apparatus determines feature metadata corresponding to a successfully matched to-be-matched content feature based on a stored correspondence between a to-be-matched content feature and feature metadata, and determines a copyright transaction identifier corresponding to the to-be-matched feature metadata based on a stored correspondence between feature metadata and a copyright transaction identifier. The rights defense detection service apparatus determines whether a copyright transaction ID corresponding to the to-be-matched feature metadata is the same as a copyright transaction identifier corresponding to the rights-to-be-defended feature metadata; and if the copyright transaction identifier corresponding to the to-be-matched feature metadata is the same as the copyright transaction identifier corresponding to the rights-to-be-defended feature metadata, determines that a rights defense detection result is "infringing", or if the copyright transaction identifier corresponding to the to-be-matched feature metadata is different from the copyright transaction identifier corresponding to the rights-to-be-defended feature metadata, determines that a rights defense detection result is "non-infringing".

Compared with the prior art, in the solutions provided in the present invention, rights defense detection can be performed for a copyright provided by any content distributor.

BRIEF DESCRIPTION OF DRAWINGS

To describe the technical solutions in the embodiments of the present invention, the following briefly describes the accompanying drawings used for describing the embodiments. Apparently, what are disclosed in this specification merely show some embodiments of the present invention, and a person of ordinary skill in the art can derive other embodiments from these accompanying drawings and embodiments without creative efforts.

DESCRIPTION OF EMBODIMENTS

Figure 1:
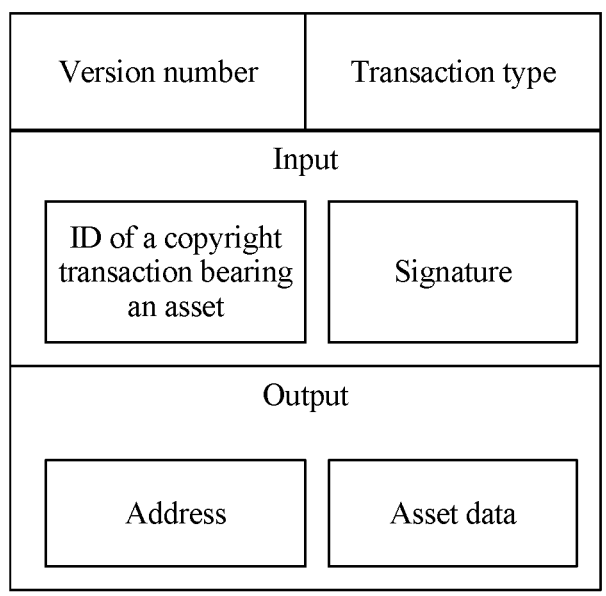
FIG. 1 is a schematic diagram of a data structure of a transaction according to an embodiment of the present invention.

This application is further described in detail with reference to the accompanying drawings and embodiments. It should be understood that the specific embodiments described herein are merely used to explain this application but are not intended to limit this application.

To resolve a problem that rights defense detection cannot be performed on content distributed by an illegal content distributor, an embodiment of the present invention provides a decentralized method and system for content rights defense detection, so that any person or any organization can conveniently perform content feature registration for digital content and implement a tamper-resistant purpose and a content uniqueness proof. Based on successful registration, a rights owner may release a detection task for copyright rights defense detection, and attract, through an incentive, a third party to provide a rights defense detection service and a consumer to participate in a rights defense activity for rights defense detection, so that all persons that consume digital content participate in rights defense detection activities. In this way, a rights defense detection range covers various content distribution channels on the Internet, including illegal content distribution channels, thereby more quickly and more effectively discovering infringement behavior and protecting interests of a copyright owner.

In the present invention, a fully decentralized rights defense system for digital content rights defense detection includes a distributed feature database, a distributed rights defense detection service, rights defense detection clients distributed on various consumer electronics devices (such as mobile phones, PCs, tablet computers, and intelligent devices), and a P2P digital copyright blockchain. A copyright transaction, a content feature transaction, a detection task transaction, a detection report transaction, or the like is recorded in a blockchain, and the blockchain is stored in all blockchain processing apparatuses in the rights defense detection service system in a P2P network. A transaction cannot be modified after being added to a blockchain. Therefore, a tamper-resistant purpose and a time-based existence proof can be ensured in a rights defense detection operation process, thereby ensuring copyright management and rights defense detection that are trusted, transparent, and secure. A decentralized P2P rights defense detection system is constructed based on a blockchain technology and a distributed feature database. Through coordination between distributed rights defense detection services and rights defense detection clients worldwide, comprehensive rights defense detection coverage is implemented for content distributed by content distribution channels on the Internet, including rights defense detection for legal and illegal content distribution channels.

The following describes knowledge points used in the present invention. It should be noted that, for brevity of the whole specification, the same content is generally described only in one place. Same content in the specification may be mutually referenced. Some content may be described in different parts in this patent, and there may be descriptions provided from different dimensions or perspectives. This however does not affect a fact that these descriptions express a same meaning.

A rights owner is a natural person, a legal person or a social institution that owns rights over digital content. The rights owner may be or may not be a creator of digital content. Generally, a creator of digital content is a rights owner. However, if rights are transferred, a target object of the rights transfer is the rights owner. The rights owner can implement full control on digital content distribution.

A content distributor is an organization that provides a content distribution service for consumers. The content distributor may have a plurality of content apparatuses. The content apparatus may send digital content to final consumers, and may also receive digital content uploaded by a rights owner. The content apparatus provides content storage and P2P network transmission capabilities.

Digital content may include literary works, text, videos, audios, animations, games, application software, pictures, flash, and the like. It should be noted that, only several types of common digital content production forms are listed herein, and these types of production forms are not limited.

In the present invention, rights over digital content include a copyright. Rights owned by a copyright are prescribed by law, and the rights prescribed by law may vary with a country. Generally, rights over a copyright include a right of publication, a right of authorship, a right of revision, a right of integrity, a right of reproduction, a right of distribution, a right of rental, a right of exhibition, a right of performance, a right of presentation, a right of broadcasting, a right of communication through information network, a right of adaptation, a right of translation, and the like. Ownership and a range of rights over digital content may be clarified by using a copyright notice made upon copyright registration. The copyright notice generally includes identity information of a copyright owner, a digital content identifier, a description of copyright rights, identity information of a creator, and an asset address of the copyright owner. The copyright notice may further include a signature of the copyright owner. The copyright notice may further include basic information of digital content and a description of a production rights status. The identity information of the creator may be a personal profile of the creator. The basic information of the digital content includes an overview of or a comment on the digital content. The description of the rights status of the digital content includes a rights obtaining manner, a rights ownership status and description, and the like.

A digital content usage license contains rights rules specified by a copyright owner for content usage or a sending operation by a consumer or a content distributor, an asset address of an authorized object, a decryption key for digital content, and an authorized digital content identifier. In the present invention, the digital content usage license may be referred to as a license for short. Generally, the rights rules specified by the copyright owner for content usage or the sending operation by the consumer or the content distributor may also be referred to as license information. Specifically, the license information includes information such as a license, and the license information may include an operation whose execution is allowed by the license, an operation constraint imposed by the license, and a license sending constraint. The asset address of the authorized object may generally also be referred to as a license asset address. The license information may include the following content: A. an operation type with allowable execution, for example, play, display, running, printing, or export; B. a constraint for a content operation, for example, an allowable quantity of operation times, an allowable operation time, or an allowable geographic location of a content operation; and C. a license sending constraint, which specifies whether sending this license to others (consumers/other content distributors) is allowed, and may include the following sending constraint: a quantity of sending times, a start/end sending time, sending duration, or the like. In general settings, a license issued to a terminal consumer cannot be sent (for example, the quantity of sending times is set to 0).

An asset is a right to own or use a copyright and a license of digital content by a copyright owner, content distributor, and a consumer. The asset may include a copyright and a license.

A blockchain technology is decentralized and a distributed-structure-based method for data storage, transmission, and proofs. A data block is used to remove dependency of the Internet on a central server, so that all data changes or transaction items are recorded in one cloud system, thereby theoretically implementing data self-proving in data transmission. In this embodiment of the present invention, a blockchain is stored in all blockchain processing apparatuses in an entire network.

In this embodiment of the present invention, there is a plurality of copyright management processes or rights defense detection processes, for example, rights defense detection and rights defense release. In this embodiment of the present invention, data that records these copyright management processes or rights defense detection processes is referred to as a copyright management transaction, and may be referred to as a transaction for short. Copyright management transactions may be classified into a copyright transaction, a license transaction, a content feature transaction, a detection task transaction, a detection report transaction, and a detection report acknowledgment transaction. A transaction includes a version number, transaction type, input content, and output content. The version number indicates a version of a data structure bearing the transaction. The input content includes an input source indicating an asset borne by a transaction, specifically including a transaction identifier of a copyright management transaction currently bearing the asset, an index of the asset in the copyright management transaction, and a signature of an asset owner. It should be noted that, a transaction bearing an asset is a transaction currently bearing the asset. For example, in a case of copyright registration, because a current copyright has not been registered, there is no transaction bearing the asset at present. Therefore, the input content is empty at this time. In a case of a copyright transfer, a transaction currently bearing the asset is a transaction identifier of a transaction in which a copyright before the transfer is located. Certainly, because the copyright transfer has not been completed, there is no transaction identifier of a transaction in which a copyright after the transfer is located. The output content includes an asset address of an output object, and asset data. A transaction identifier may be a hash value obtained after operation is performed, based on a hash algorithm, on data included in a transaction. There is a plurality of types of hash algorithms, for example, a secure hash algorithm (SHA) and a message digest algorithm 5 (MD5). It should be noted that, although there are many hash algorithms, it needs to be ensured that hash algorithms used for operation performed on same data on different network elements need to be the same. An output index indicates the index of the asset in a transaction in which the asset is located, and facilitates a search for the asset in the transaction. The output index may be empty. For ease of description, in a subsequent embodiment, a transaction identifier and an index of an asset in a transaction in which the asset is located may be simplified as a transaction identifier in some parts.

A transaction identifier that is of a copyright management transaction currently bearing an asset and that is included in the output content varies with a transaction type. An index of the asset in the copyright management transaction and a private key signature of an asset owner also vary with the transaction type. The output content includes an asset address indicating an asset output owner, and asset data. The asset output owner may specifically be a rights defense release owner or a rights defense detection service apparatus. The asset data indicates an asset bearing a transaction. An asset data type definition varies with a transaction type, and includes a license asset, a content feature, a detection task, and a detection report.

There may be many forms of transaction data structures. For example, a transaction may use a table, a file, or a specific data structure. For example, in a data structure in FIG. 1, a transaction includes a transaction version number, a transaction type, input content, and output content.

Figure 2:
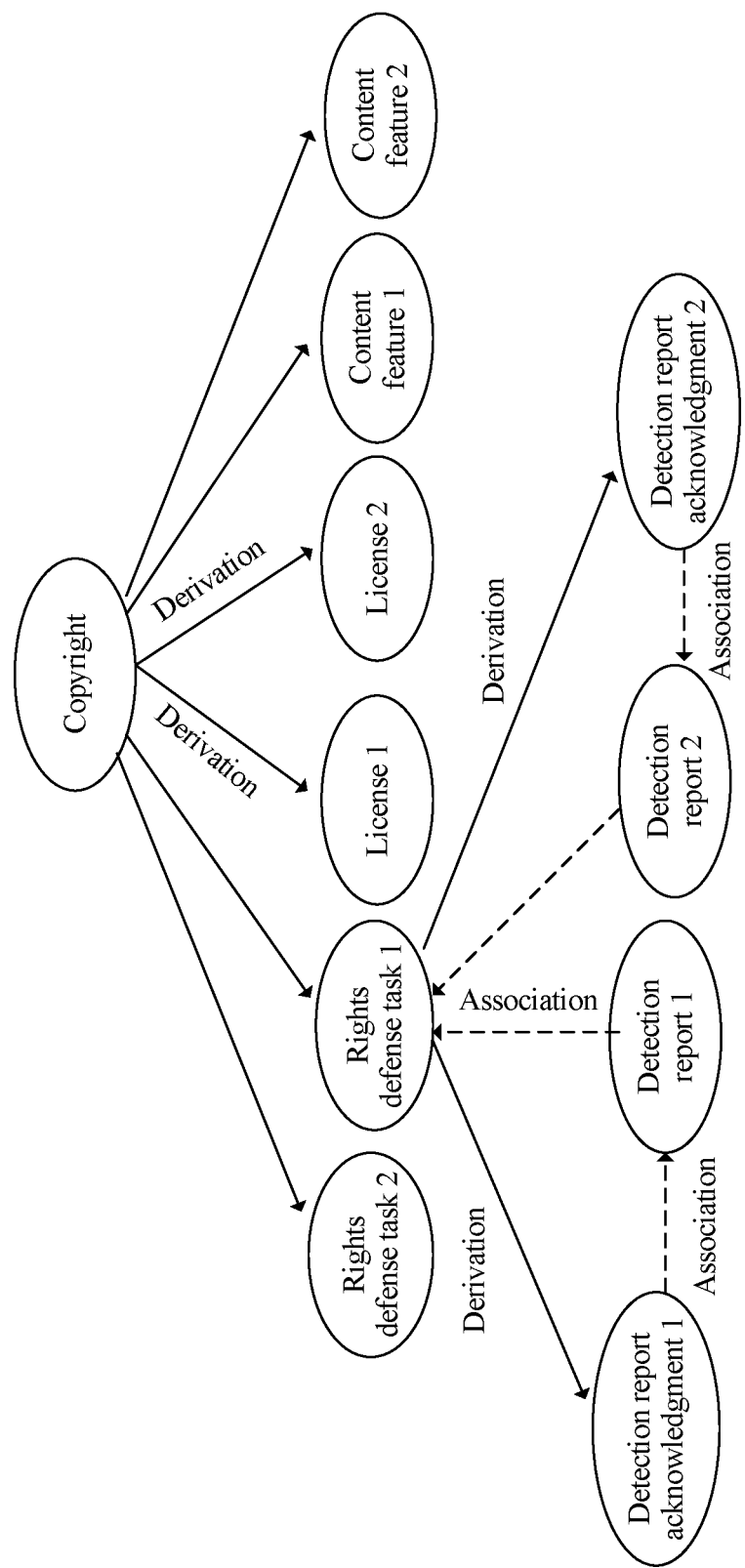
FIG. 2 is a schematic diagram of a relationship between a copyright, a license, a rights defense task, and a content feature that are of digital content according to an embodiment of the present invention.

As shown in FIG. 2, generally, one piece of digital content may have one copyright. However, many licenses, content features, detection tasks may be derived based on one copyright. Herein, the copyright may be used as a license, a content feature, or a parent asset of a detection task. A plurality of detection report acknowledgments may be derived from a detection task, and the detection task is used as a parent asset of the detection report acknowledgments. In addition, the detection report needs to be associated with a corresponding detection task by using information of the asset data, and the detection report acknowledgment needs to be associated with a corresponding detection report by using the information of the asset data.

A blockchain is an account book data structure of a globally open copyright transaction, and includes blocks of several transactions. Each block includes a previous block identifier linked in blockchain data, a block generation time, and a copyright management transaction, to ensure that block content cannot be tampered with, thereby implementing an existence proof for the blockchain data. Because the blockchain data is stored in a P2P network, the blockchain data is not lost when any one or more network nodes in the P2P network break down. In this way, the blockchain data has high security, to ensure that the data is permanently stored and cannot be tampered with. An identifier of a block may be a hash value obtained after operation is performed, based on a hash algorithm, on content included in the block. Specifically, the block may be divided into a head and a body. The body includes a copyright management transaction (for example, process data of a copyright transfer that Bob transfers a copyright to Alice). The head includes key metadata of the block, and generally includes a version number of a block data structure, a previous block identifier linked in blockchain data, the identifier of the current block, and a generation timestamp of the current block. When a block is added to the blockchain data, this block needs to be added to blockchains stored in all blockchain processing apparatuses in the entire network. Blocks are added to the blockchain data one by one in an adding time sequence. Each block except a first block in the blockchain data needs to be linked to a previous block thereof. As a result, one block is linked to another in the blockchain data, just like a chain. After one block is added to a blockchain, the block cannot be modified. In the blockchain data, a previous block is generally understood as a previous block in the blockchain.

A public key and a private key are one key pair (that is, one public key and one private key) obtained by using an encryption algorithm. For example, the encryption algorithm is an asymmetric encryption algorithm such as Rivest-Shamir-Adleman (RSA) or a digital signature algorithm (DSA). The public key is an open part in the key pair and is externally open. The private key is a non-open part and is not externally open, and needs to be stored by a user. The public key is generally used to encrypt a session key, verify a digital signature, or encrypt data that can be decrypted by using the corresponding private key. The key pair obtained through such algorithm can ensure worldwide uniqueness. When this key pair is used, if one of the keys is used to encrypt a segment of data, the other key needs to be used for decryption. For example, data encrypted by using the public key needs to be decrypted by using the private key. If the private key is used for encryption, the public key needs to be used for decryption. Otherwise, the decryption fails. In this embodiment of the present invention, the public key and private key each generally have a length of 256 bits or more. The public may be used to generate an asset address, and used in a copyright management process to identify a copyright owner, an object that receives a license, an object owning a product (a specific object that the product belongs to), an object to which a content file is uploaded, or an object to which a content file is downloaded. The private key is a signature certificate used by the copyright owner for a copyright asset transaction, for example, used to perform authentication on an identity of the copyright owner, a license recipient, or a product recipient.

An asset address is a result generated after specific operation is performed on a public key. The asset address is in a one-to-one correspondence with the public key. The asset address may be the public key, a hash value of the public key, a script segment containing the public key and an operation instruction, or the like. For example, the asset address may be in the following form: the public key+a space+OP_CheckSIG OP_CheckSIG indicates performing a signature check operation. This script segment instructs a related device to check a signature in input by using the public key and the OP_CheckSIG operation. The asset address may be used to identify an identifier of a copyright owner, identify an organization or individual that receives a license, identify an organization or individual that receives a product, or identify a content apparatus. Specifically, the asset address of the copyright owner may be in a plurality of forms such as a public key of the copyright owner, or a public key hash value generated after hash operation is performed on the public key of the copyright owner based on a hash algorithm, or a script segment containing the public key.

A digital content identifier may be a digital content hash value obtained after operation is performed on a digital content file and an asset address of a copyright owner based on a hash algorithm, provided that it can be ensured that the digital content identifier represents unique digital content in the P2P network. The digital content identifier may also be in other forms. The digital content hash value is used to identify uniqueness of the digital content. The digital content identifier is stored in a blockchain in each blockchain processing apparatus, a copyright management client, an upload client, or a download client. Because a copyright may be transferred, one copyright may be owned by different copyright owners at different times. An asset address varies with a copyright owner. Therefore, the digital content identifier varies with a copyright owner thereof. In other words, a signature of the copyright owner may be used to verify whether the copyright owner owns the copyright.

A signature may be a result of encryption operation performed on a segment of random digits (for example, digital content, a digital content identifier, or a license) by using a private key. The signature may be verified by using a public key. If the verification succeeds, it indicates that signed digital content is released by an owner of the public key and trusted; otherwise, it indicates that signed data is forged and untrusted.

For blocks in a blockchain, all nodes (the nodes may also be referred to as blockchain processing apparatuses in this embodiment of the present invention) that participate in blockchain data maintenance in the P2P network need to meet a consistent public trust constraint and a consistent proof rule. A block creation node has a right to create a block. Any node can verify whether a block meets a consensus constraint by using the public trust constraint and the proof rule. With the consensus constraint, any person or organization only needs to verify whether a block meets the consensus constraint, thereby verifying whether a block is trusted, without a need to trust an organization. There are many types of consensus constraints, including a proof of work (POW), a proof of stake POS, a raft algorithm, and another consensus mechanism. For example, POW constraint content includes: A node needs to find a nonce, and this nonce needs to enable a number, with first N bits being 0s, required by a bitcoin algorithm to occur in a random hash value of the block. The node finds the nonce through repeated attempts, and has the right to create a block once the nonce is found. Other nodes verify whether the block meets the PoW consensus constraint, and if the block meets the PoW consensus constraint, determine that the block is obtained through honest efforts of the nodes, thereby trusting and admitting the block. In this way, all nodes in the network reach consensus over one block, and this block can be officially generated.

The embodiments of the present invention provide a digital content consumption developer with a software development kit (SDK); provide an application programming interface (API) of a digital copyright blockchain, so that a content consumption terminal application obtains a license by using the API, and uses content based on the license; provide copyright management software for a copyright owner, a content distributor, and other supervision and query institutions as a copyright management service client; and provide graphical user interfaces for copyright registration, product creation, a license management service, and content upload and access.

Figure 3:
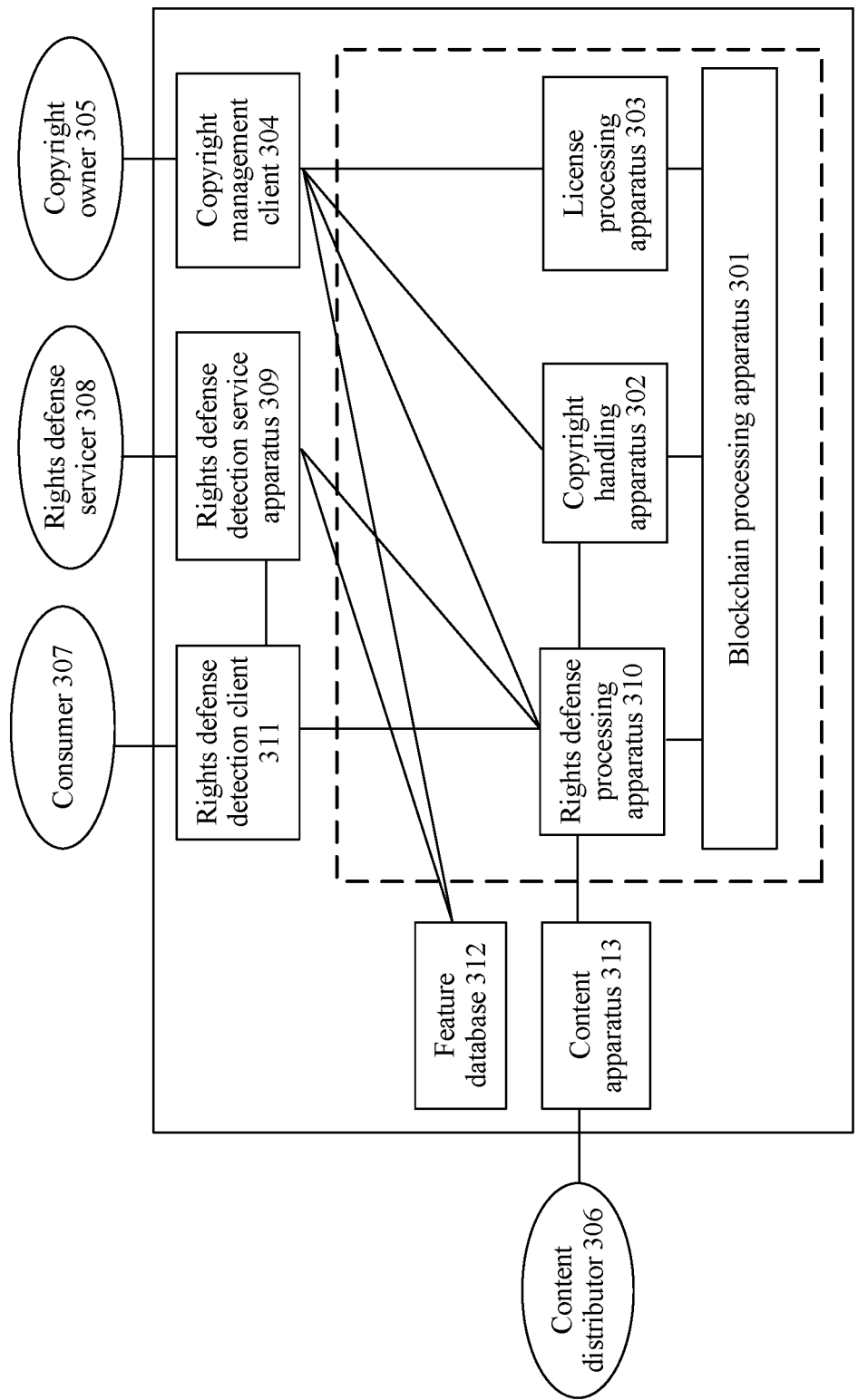
FIG. 3 is a schematic diagram of an application scenario of a copyright rights defense detection system according to an embodiment of the present invention.

FIG. 3 is a block diagram of a copyright rights defense detection system based on a P2P network provided in an embodiment of the present invention. The system includes a blockchain processing apparatus 301, a copyright handling apparatus 302, a license processing apparatus 303, and a rights defense processing apparatus 310. The system may further include a copyright management client 304, a rights defense detection service apparatus 309, a rights defense detection client 311, a feature database 312, and a content apparatus 313. The system may relate to four roles, including a copyright owner 305, a content distributor 306, a consumer 307, and a rights defense servicer 308. The copyright handling apparatus 302, the license processing apparatus 303, and the rights defense processing apparatus 310 separately connect to the blockchain processing apparatus 301. The copyright owner 305 logs in to the system by using a connection of the copyright management client 304. The consumer 507 logs in to the system by using a connection of the rights defense detection client 311. The content distributor 506 logs in to the system by using a connection of the content apparatus 313. The rights defense servicer 308 logs in to the system by using a connection of the rights defense detection service apparatus 309.

The copyright management client 304, the rights defense detection service apparatus 309, and the rights defense detection client 311 may be provided in an application software (APP) or SDK manner. An app may be a piece of integral copyright management software, and directly interact with the rights defense processing apparatus, the copyright handling apparatus, or the license processing apparatus. The SDK manner may be integrated on third-party software, and provide rich functions together with the third-party software. The copyright management client 304, the rights defense detection service apparatus 309, and the rights defense detection client 311 may be installed on a terminal device. The terminal device may be a smartphone, a smartwatch, a tablet computer, a common computer device, or the like.

The blockchain processing apparatus 301 may be any trusted node on a formed P2P network, or may be any node on a fully open P2P network. The blockchain processing apparatus 301 may be equipped on a general-purpose computing device, and each computing device is referred to as a peer. For example, the general-purpose computing device may be a common computer, a portable computer, or the like. In addition, if the copyright handling apparatus 302, the license processing apparatus 303, or the rights defense processing apparatus 310 is integrated on a same device with the blockchain processing apparatus 301, the integrated device is the foregoing peer, and in this case, this apparatus may be referred to as a blockchain apparatus. In other words, in this embodiment of the present invention, the blockchain apparatus includes the blockchain processing apparatus 301, the copyright handling apparatus 302, the license processing apparatus 303, and the rights defense processing apparatus 10. In this case, in the following processes, a process of interaction between the blockchain processing apparatus 301 and the license processing apparatus 303, between the blockchain processing apparatus 301 and the copyright handling apparatus 302, or between the blockchain processing apparatus 301 and the rights defense processing apparatus 310 may be considered as a process of interaction between internal modules of the blockchain apparatus. For ease of description, the process of the interaction between the internal modules of the blockchain apparatus may be not described in some embodiments of the present invention.

The blockchain processing apparatus 301 stores a transaction after receiving the transaction sent from the copyright handling apparatus 302, the license processing apparatus 303, or the rights defense processing apparatus 310. For example, the blockchain processing apparatus 301 is configured to broadcast a successfully verified transaction and a block. A transaction is packetized into a block by using a consensus mechanism, and the block is linked to a global blockchain and broadcast to all peers in the network.

The blockchain processing apparatus 301 is further configured to perform blockchain integrity verification. The blockchain integrity verification includes verification on the following content: whether a block is pointed to a previous block, whether a generation timestamp of the block is correct, whether the block meets a consensus constraint, whether a Merkle tree for a transaction packetized in the block matches data included in the transaction, and the like. In a verification process, the following is verified: whether a hash value that is of a previous block and that is included by a new block exists, whether a hash value that is of a transaction, included in a blockbody, and obtained through calculation by using a Merkle tree matches a hash value included in a blockhead, and whether a block meets a consensus constraint. For example, when the consensus constraint is a proof of work mechanism, the following is verified: whether a hash value of a blockhead meets a proof of work required by a block, that a difference between a block generation timestamp and a current time is not greater than a specific value, and that the block generation timestamp needs to be later than a time of a previous block.

The blockchain processing apparatus 301 is further configured to locally store blockchain data. Data is stored in a plurality of manners, for example, stored in a database, or stored in a file manner.

The copyright handling apparatus 302 is configured to receive a metadata query request sent by the rights defense detection service apparatus, obtain feature metadata corresponding to a detection task transaction identifier from a corresponding blockchain processing apparatus, and send a metadata query response including the feature metadata to the rights defense detection service apparatus.

The license processing apparatus 303 is configured to receive the license query request, obtain license information corresponding to the detection task transaction identifier from a corresponding blockchain processing apparatus, and send the license query response including the license information to the rights defense detection service apparatus.

The copyright handling apparatus 304 is further configured to receive a content feature registration request sent by the copyright management client, and after successfully verifying the content feature registration request, construct a content feature transaction based on the content feature registration request, set a transaction identifier of a transaction currently bearing an asset and a signature of an asset owner that are in input content included in the content feature transaction respectively to a copyright transaction identifier and a private key signature of a copyright owner, set an address in output content included in the content feature transaction to an address of a content feature owner, set asset data in the content feature transaction to the feature metadata; and store the content feature transaction in a blockchain in the corresponding blockchain processing apparatus.

The rights defense detection service apparatus 309 is configured to send the metadata query request to the copyright handling apparatus, where the metadata query request includes the detection task transaction identifier; receive the metadata query response that is sent by the copyright handling apparatus and that includes the feature metadata, where the feature metadata is obtained by the copyright handling apparatus based on the detection task transaction identifier from a blockchain stored in the blockchain processing apparatus; obtain a content feature corresponding to the feature metadata from the feature database, where the content feature is a rights-to-be-defended content feature; send the license query request to the license processing apparatus, where the license query request includes the detection task transaction identifier; receive the license query response that is sent by the license processing apparatus and that includes the license information, where the license information is obtained by the license processing apparatus based on the detection task transaction identifier from a blockchain stored in the blockchain processing apparatus; and perform rights defense detection for a copyright based on the obtained rights-to-be-defended content feature and the license information.

When performing rights defense detection for a copyright based on the obtained rights-to-be-defended content feature and the license information, the rights defense detection service apparatus 309 may specifically receive a detection task request sent by the rights defense detection client, where the detection task request includes a content distribution identifier; allocate a rights defense detection task to the rights defense detection client based on the content distribution identifier; send a detection task response to the rights defense detection client, where the detection task response includes a task allocation result, a sequence number of a to-be-matched content feature segment, and a segment size; receive a content feature reporting request sent by the rights defense detection client, where the content feature reporting request includes the content distribution identifier, a content feature extraction result, the sequence number of the to-be-matched content feature segment, and a to-be-matched content feature segment; perform matching based on the to-be-matched content feature segment and the rights-to-be-defended content feature, to obtain the matching result; and perform, based on the license information, rights defense detection for a copyright corresponding to a to-be-matched content feature whose matching result indicates a success.

Alternatively, when performing rights defense detection for a copyright based on the obtained rights-to-be-defended content feature and the license information, the rights defense detection service apparatus 309 may specifically obtain to-be-matched feature metadata from the blockchain processing apparatus corresponding to the copyright handling apparatus; obtain a to-be-matched content feature from the feature database based on the to-be-matched feature metadata; perform matching based on a to-be-matched content feature segment and the rights-to-be-defended content feature, to obtain a matching result; and when the matching result indicates a success, determine whether a copyright transaction identifier corresponding to the to-be-matched feature metadata is the same as a copyright transaction identifier corresponding to rights-to-be-defended feature metadata; and if the copyright transaction identifier corresponding to the to-be-matched feature metadata is the same as the copyright transaction identifier corresponding to the rights-to-be-defended feature metadata, determine that a rights defense detection result is "infringing", or if the copyright transaction identifier corresponding to the to-be-matched feature metadata is different from the copyright transaction identifier corresponding to the rights-to-be-defended feature metadata, determine that a rights defense detection result is "non-infringing".

A process in which the rights defense detection service apparatus 309 allocates a rights defense detection task specifically includes: determining whether the content distribution identifier exists, and if the content distribution identifier does not exist, sets the sequence number of the to-be-matched content feature segment to 1, setting the segment size according to a preconfigured rule, and setting the task allocation result to successful; or if the content distribution identifier exists and a corresponding detection task state is in-progress, querying a maximum sequence number of an allocated to-be-matched content feature segment based on the content distribution identifier, setting the sequence number of the to-be-matched content feature segment to be equal to the maximum sequence number of the allocated to-be-matched content feature segment+1, setting the segment size according to a preconfigured rule, and setting the task allocation result to successful; or if the content distribution identifier in the detection task request exists and a corresponding detection task state is ended, setting the task allocation result to ended.

A specific process in which the rights defense detection service apparatus 309 performs rights defense detection includes: obtaining, based on a stored association relationship between a content feature and a content feature transaction ID, a content feature transaction ID corresponding to the to-be-matched content feature whose matching result indicates a success; obtaining, based on a stored association relationship between a content feature transaction ID and a copyright transaction ID, a copyright transaction ID corresponding to the content feature transaction ID; and if license information corresponding to the obtained copyright transaction ID is empty, determining, based on a stored correspondence between a copyright transaction ID and license information, that a rights defense detection result is "infringing"; or if license information corresponding to the obtained copyright transaction ID is not empty, determining whether a distribution constraint of a license included in the license information is valid; and if the distribution constraint of the license is invalid, determining that a rights defense detection result is "infringing", or if the distribution constraint of the license is valid, determining that a rights defense detection result is "non-infringing".

The rights defense detection service apparatus 309 is further configured send a detection report submission request to the rights defense processing apparatus, where the detection report submission request includes an address of a detection report asset owner, a detection report submission time, the content distribution identifier, a content feature transaction ID of infringed content, the detection task transaction ID, and a content feature matching degree.

The rights defense detection service apparatus 309 is further configured to send a detection task query request to the rights defense processing apparatus, where the detection task query request includes the detection task transaction identifier; and receive, by the rights defense detection service apparatus, a detection task query response that is sent by the rights defense processing apparatus and that includes one or more detection task transactions, where the detection task transaction is obtained by the rights defense processing apparatus based on the detection task transaction identifier from a blockchain stored in a blockchain processing apparatus.

The rights defense processing apparatus 310 is configured to: after receiving the detection report submission request and successfully verifying the detection report submission request, construct a detection report transaction based on the detection report submission request, set each of a transaction ID of a transaction currently bearing an asset and a signature of an asset owner that are in input content in the detection report transaction to be empty, set an address in output content in the detection report transaction to the address of the detection report asset owner, and set asset data in the output content in the detection report transaction to the detection report submission time, the content distribution identifier, the content feature transaction ID of infringed content, the detection task transaction ID, and the content feature matching degree; and send the detection report transaction to the blockchain in the blockchain processing apparatus for storage.

The rights defense processing apparatus 310 is further configured to receive a detection task release request sent by the copyright management client, and after successfully verifying the detection task release request, construct a detection task transaction based on the detection task release request, set a transaction ID of a transaction currently bearing an asset and a signature of an asset owner that are in input content included in the detection task transaction respectively to a copyright transaction identifier and a private key signature of a copyright owner, set an address in output content to an address of a detection task owner, set asset data in the output content to detection task execution information and a detection task release time, and store the detection task transaction in the blockchain in the corresponding blockchain processing apparatus.

The rights defense detection client 311 is configured to send the detection task request to the rights defense detection service apparatus, and receive rights-to-be-defended feature metadata; obtain a rights-to-be-defended content feature corresponding to the rights-to-be-defended feature metadata from the feature database; and obtain to-be-matched digital content corresponding to the content distribution identifier from the content apparatus, extract a to-be-matched content feature segment from the to-be-matched digital content based on a content feature extraction algorithm, perform matching between the to-be-matched content feature segment and the rights-to-be-defended content feature, and send a detection report submission request to the rights defense detection service apparatus, where the detection report submission request includes an address of a detection report asset owner, a detection report submission time, the content distribution identifier, a successfully matched content feature, and a content feature matching degree.

Figure 4:
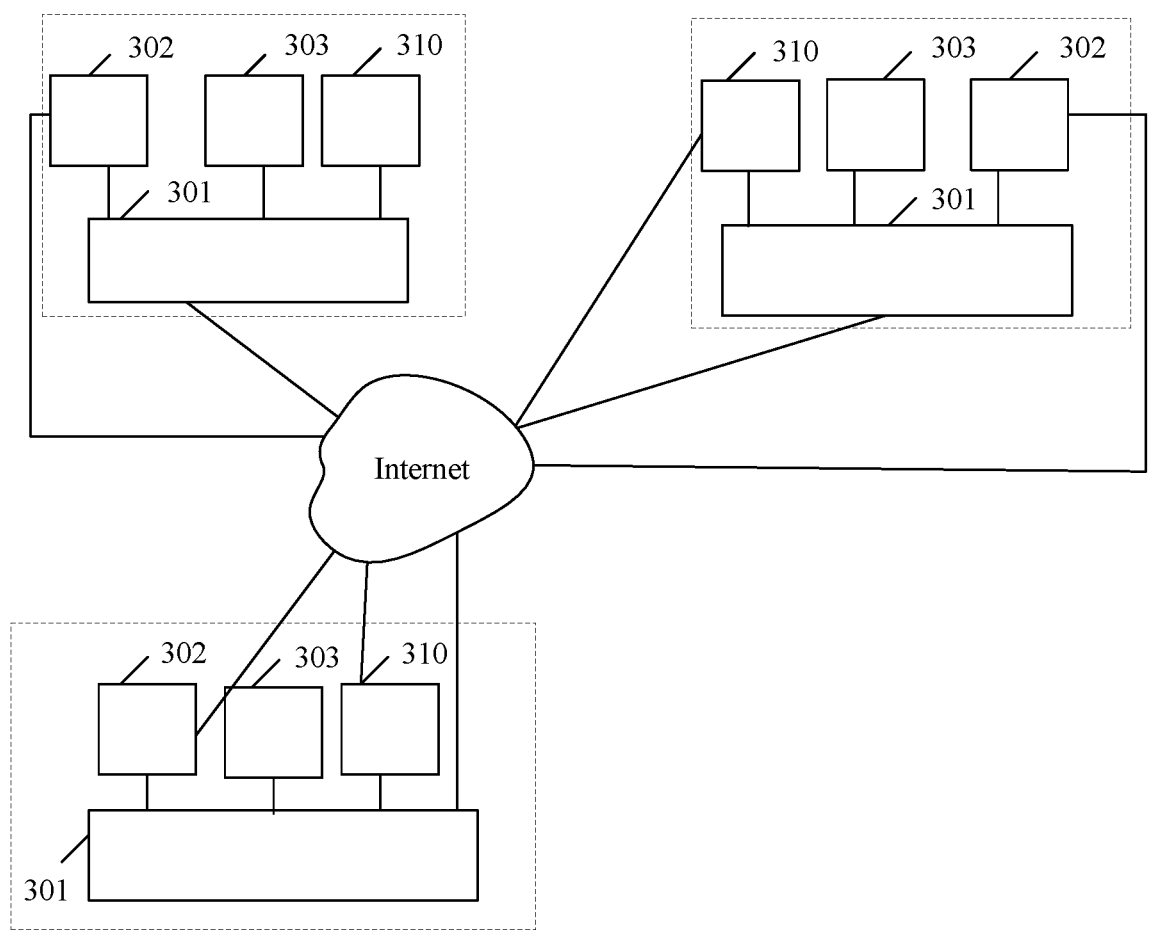
FIG. 4 is a schematic structural diagram of a copyright rights defense detection system according to an embodiment of the present invention.

FIG. 4 shows a network architecture of a blockchain processing apparatus according to an embodiment of the present invention. In a P2P network, a plurality of blockchain processing apparatuses 301 are mutually connected. In other words, each blockchain processing apparatus 301 may be connected to the Internet, so that all blockchain processing apparatuses are mutually connected. As described above, the copyright handling apparatus 302, the license processing apparatus 303, and the rights defense processing apparatus 310 each may be independent of the blockchain processing apparatus 301. In this case, the copyright handling apparatus 302, the license processing apparatus 303, and the rights defense processing apparatus 310 each may be in a one-to-one correspondence with the blockchain processing apparatus 301. In addition, (all or some of) the copyright handling apparatus 302, the license processing apparatus 303, and the rights defense processing apparatus 310 may be a part of the blockchain processing apparatus 301.

Figure 5:
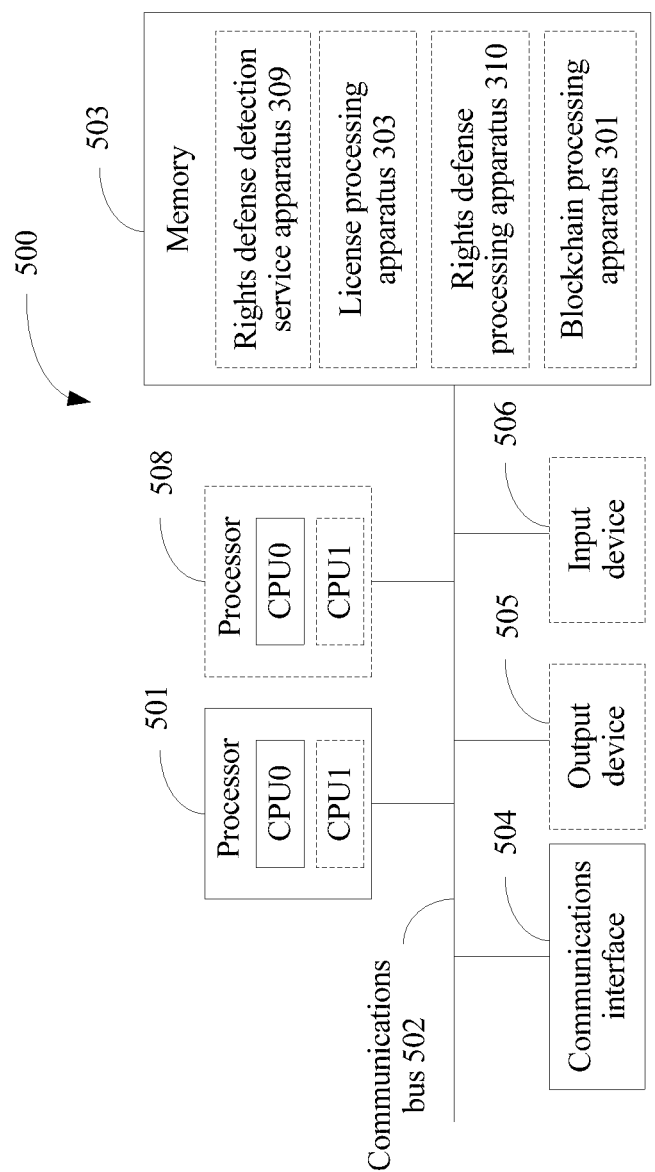
FIG. 5 is a schematic diagram of a computer device according to an embodiment of the present invention.

FIG. 5 is a schematic diagram of a computer device according to an embodiment of the present invention. A computer device 500 includes at least one processor 501, a communications bus 502, a memory 503, and at least one communications interface 504. In this embodiment of the present invention, the blockchain processing apparatus 301 may be a piece of software installed on the computer device 500, and the processor 501 executes program code stored in the memory 503 to implement the function described above. The copyright management client 304, the rights defense detection server apparatus 309, the rights defense detection client 311, the rights defense processing apparatus 310, the license processing apparatus 303, the copyright handling apparatus 302, and the content apparatus may be implemented similarly in a manner of the computer device (or system) in FIG. 5, that is, the processor executes the program code stored in the memory to implement a corresponding function. Moreover, the blockchain processing apparatus 301, the rights defense processing apparatus 310, the license processing apparatus 303, and the copyright handling apparatus 302 may be installed on a same computer device shown in FIG. 5 or installed on different computer devices. The copyright management client 504, an upload client 509, and a download client 511 may also be installed on a same computer device shown in FIG. 5 or installed on different computer devices.

The processor 501 may be a general-purpose central processing unit (CPU), a microprocessor, an application-specific integrated circuit (ASIC), or one or more integrated circuits used to control program execution of the solution in the present invention. In specific implementation, as an embodiment, the computer device 500 may include a plurality of processors such as the processor 501 and a processor 508 in FIG. 5. Each of these processors may be a single-core processor or may be a multi-core processor. The processor herein may be one or more devices, circuits and/or processing cores used to process data (for example, a computer program instruction). The processor 501 or 508 may include one or more CPUs, for example, CPU0 and CPU1 in FIG. 5.

The communications bus 502 may include a path in which information is transmitted between the foregoing components. The communications interface 504 is configured to communicate with other devices or communications networks, such as an Ethernet, a radio access network (RAN), and a wireless local area network (WLAN).

The memory 503 may be a read-only memory (ROM) or another type of static storage device that can store static information and an instruction, a random access memory (RAM) or another type of dynamic storage device that can store information and an instruction; and may also be an electrically erasable programmable read-only memory (EEPROM), a compact disc read-only memory (CD-ROM) or other compact disc storages, optical disc storages (including a compact disc, a laser disc, an optical disc, a digital versatile disc, and a Blu-ray disc, and the like), and a disk storage medium or other disk storage devices, or any other medium that can be used to carry or store expected program code that has an instruction or data structure form and that can be accessed by a computer, which, however, is not limited herein. The memory may exist independently and is connected to the processor by using the bus. The memory may also be integrated with the processor.

In specific implementation, as an embodiment, the computer device 500 may further include an output device 505 and an input device 506. The output device 505 communicates with the processor 501 and may display information in a plurality of manners. For example, the output device 505 may be a liquid crystal display (LCD), a light emitting diode (LED) display device, a cathode ray tube (CRT) display device, a projector, or the like. The input device 506 communicates with the processor 501 and may receive input of a user in a plurality of manners. For example, the input device 506 may be a mouse, a keyboard, a touch panel device, a sensor, or the like.

The foregoing computer device 500 may be a general-purpose computer device or a special-purpose computer device. In specific implementation, the computer device 500 may be a desktop computer, a portable computer, a network server, a personal digital assistant (PDA), a mobile phone, a tablet computer, a wireless terminal device, communication equipment, a built-in device, or a device having a similar structure in FIG. 5. A type of the computer device 500 is not limited in this embodiment of the present invention.

The copyright handling apparatus, the license processing apparatus, the rights defense processing apparatus, or the blockchain processing apparatus in FIG. 3 or FIG. 4 may be one or more software modules stored in the memory of the device shown in FIG. 5.

Figure 6:
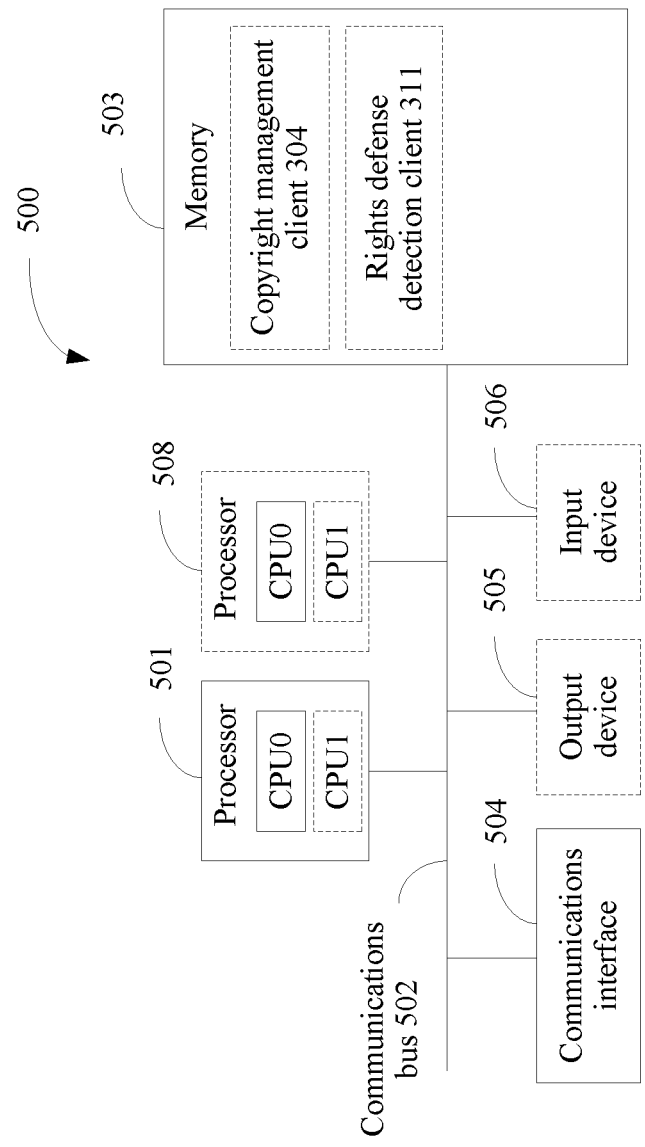
FIG. 6 is a schematic diagram of another computer device according to an embodiment of the present invention.

The blockchain processing apparatus 301, the rights defense processing apparatus 310, the license processing apparatus 302, and the copyright handling apparatus 302 may be installed on a same computer device shown in FIG. 5 or installed on different computer devices. Similarly, a content detection client and the copyright management client may be software installed in the computer device. Through the Internet, a computer device that has these clients installed may interact with a computer device that has the blockchain processing apparatus, the rights defense processing apparatus, the license processing apparatus, and the copyright handling apparatus installed, and interact with a computer device that has the rights defense detection service apparatus installed, to implement a copyright rights defense detection function. FIG. 6 shows a schematic diagram of the computer device of these clients. In specific implementation, the computer device of the clients may be a desktop computer, a portable computer, a network server, a personal digital assistant (PDA), a mobile phone, a tablet computer, a wireless terminal device, communication equipment, a built-in device, or the like. This is not limited in this embodiment of the present invention.

After a copyright owner registers a copyright of digital content, each blockchain processing apparatus in the network has already recorded the copyright of the digital content. The copyright owner may further upload the digital content to a content apparatus, so that a consumer may download the digital content from the content apparatus. Based on a common aspect of the present invention described above, the following further describes in detail a method for controlling a process in which a copyright owner implements content distribution by using a blockchain technology.

An embodiment of the present invention provides a copyright rights defense detection framework solution that is based on a blockchain technology. An implementation process of this solution includes four sub-processes: (1) a content feature registration process of a rights-to-be-defended copyright, (2) a rights defense detection task release process, (3) a rights defense detection task initialization process, and (4) a process of four types of rights defense detection. It should be noted that, (1), (2), and (3) are different phrases of a copyright rights defense detection process, and the three processes each may be used as an independent technical solution.

In the content feature registration process of the rights-to-be-defended copyright, a copyright management client sends a content feature storage request to a feature database, to store a content feature in the distributed feature database. After successful content feature registration, the copyright management client further sends a content feature registration request to a copyright handling apparatus, so that the copyright handling apparatus verifies the content feature registration request, where the content feature registration request includes an address of a content feature owner, a copyright transaction ID, a private key signature of a copyright owner, and feature metadata. The copyright handling apparatus verifies whether the address of the content feature owner, the copyright transaction ID, and the private key signature of the copyright owner are valid, and if the verification succeeds, constructs a content feature transaction including the feature metadata, and stores the content feature transaction in a blockchain in a blockchain processing apparatus. In this way, the content feature is stored in the distributed feature database, and the feature database is stored in the blockchain. Because the rights-to-be-defended feature metadata is stored in the blockchain, the rights-to-be-defended feature metadata cannot be tampered with, and any rights defense detection service apparatus can conveniently and securely obtain the feature metadata from the blockchain, so that rights defense detection can further be performed for a copyright by any rights defense detection service apparatus. For a more detailed description about this process, refer to an embodiment corresponding to FIG. 7.

In the rights defense detection task release process, a copyright management client sends a detection task release request to a rights defense processing apparatus, where the detection task release request may include an address of a detection task owner, a copyright transaction identifier, a private key signature of a copyright owner, detection task execution information, and a detection task release time. The rights defense processing apparatus verifies information included in the detection task release request, for example, the address of the detection task owner, the copyright transaction identifier, and the private key signature of the copyright owner, and after the verification succeeds, constructs a detection task transaction including the task execution information and the detection task release time. Then, the rights defense processing apparatus stores the detection task transaction in a blockchain in a blockchain processing apparatus. In this process, a rights defense detection task is stored in a blockchain, and a rights-to-be-defended detection task cannot be tampered with. In addition, subsequently, any rights defense detection service apparatus can conveniently and securely query the rights-to-be-defended detection task from the blockchain, so that rights defense detection can further be performed for a copyright by any rights defense detection service apparatus. For a more detailed description about this process, refer to an embodiment corresponding to FIG. 8.

In the rights defense detection task initialization process, any rights defense detection service apparatus in a P2P network may query all or some rights defense detection tasks from a blockchain processing apparatus in a scheduled manner by using a rights defense processing apparatus. When the rights defense detection service apparatus obtains one or more rights defense detection tasks, the rights defense detection service apparatus may query corresponding rights-to-be-defended feature metadata for each rights defense detection task and a rights-to-be-defended content feature thereof. The rights defense detection service apparatus may further query a license status corresponding to a rights-to-be-defended copyright for each rights defense detection task. The rights defense detection task, the feature metadata, and license information are all stored in blockchains. Therefore, the rights defense detection service apparatus can conveniently and securely query details of the rights defense detection tasks, the feature metadata, and the license information from the blockchains, so that rights defense detection can be performed for a copyright by any rights defense detection service apparatus. For a more detailed description about this process, refer to an embodiment corresponding to FIG. 9.

In the process of a first type of copyright rights defense detection, when a content usage client obtains digital content from a content apparatus, a rights defense detection client may be triggered to send a detection task request including a content distribution identifier to a rights defense detection service apparatus. The rights defense detection service apparatus allocates a detection task to the rights defense detection client, so that the rights defense detection client extracts a content feature of to-be-matched digital content. The rights defense detection service apparatus may interact with a plurality of rights defense detection clients. Therefore, for a same piece of digital content, the rights defense detection service apparatus may assign a plurality of rights defense detection clients to extract content features from different parts of the digital content in parallel. The rights defense detection client sends the extracted to-be-matched content feature to the rights defense detection service apparatus. The rights defense detection service apparatus performs matching between the to-be-matched content feature and a rights-to-be-defended content feature, and determines a license status of a successfully matched content feature, to further determine whether a copyright of the to-be-matched digital content is infringing. In addition, the rights defense detection service apparatus further stores a detection report transaction including a detection result in a blockchain in a blockchain processing apparatus. In a process of using any digital content, a user triggers the rights defense detection process, to ensure that rights defense detection is performed for a copyright of the any digital content. When extracting a content feature from allocated digital content, the rights defense detection service apparatus may divide one piece of digital content into a plurality of segments, and make a plurality of copyright detection clients to extract content feature segments from the digital content in parallel, thereby improving rights defense detection efficiency. For a more detailed description about this process, refer to an embodiment corresponding to FIG. 10A and FIG. 10B.

In the process of a second type of copyright rights defense detection, a rights defense detection client may actively send a detection task request to a rights defense detection service apparatus in a scheduled manner. Then, the rights defense detection service apparatus sends one or more rights defense detection tasks to the rights defense detection client. When a content usage client obtains digital content from a content apparatus, the rights defense detection client extracts a to-be-matched content feature segment from the digital content, and then performs a query of matching between the to-be-matched content feature segment and a rights-to-be-defended content feature. After the matching succeeds, the rights defense detection client sends a detection report submission request to the rights defense detection service apparatus. The rights defense detection service apparatus determines a license status of a successfully matched content feature, to further determine whether a copyright of the to-be-matched digital content is infringing. In addition, the rights defense detection service apparatus further stores a detection report transaction including a detection result in a blockchain in a blockchain processing apparatus. In a process of using any digital content, a user triggers the rights defense detection process, to ensure that rights defense detection is performed for a copyright of the any digital content. In addition, the rights defense detection client not only extracts the to-be-matched content feature segment, but also obtains the rights-to-be-defended content feature from the rights defense detection service apparatus and a feature database. The rights defense detection client may perform matching between the rights-to-be-defended content feature and the to-be-matched content feature segment, thereby reducing load of the rights defense detection service apparatus. For a more detailed description about this process, refer to an embodiment corresponding to FIG. 11A and FIG. 11B.

The process of a third type of copyright rights defense detection occurs during a digital content copyright registration process. Therefore, a rights defense detection service apparatus obtains to-be-matched feature metadata from a blockchain in a blockchain processing apparatus by using a copyright handling apparatus. A rights defense detection client may actively send a detection task request to the rights defense detection service apparatus in a scheduled manner. The rights defense detection service apparatus sends one or more rights defense detection tasks and the to-be-matched feature metadata to the rights defense detection client. The rights defense detection task includes rights-to-be-defended feature metadata. The rights defense detection client downloads a to-be-matched content feature and a rights-to-be-defended content feature from a feature database based on the to-be-matched feature metadata and the rights-to-be-defended feature metadata. The rights defense detection client performs a query of matching between the to-be-matched content feature and the rights-to-be-defended content feature. After the matching succeeds, the rights defense detection client sends a detection report submission request to the rights defense detection service apparatus. The rights defense detection service apparatus determines whether a copyright transaction corresponding to a successfully matched rights-to-be-defended content feature is the same as a copyright transaction corresponding to the to-be-matched content. If the copyright transaction corresponding to the successfully matched rights-to-be-defended content feature is the same as the copyright transaction corresponding to the to-be-matched content, it is considered that a registered to-be-matched copyright is infringing. In addition, the rights defense detection service apparatus further stores a detection report transaction including a detection result in a blockchain in a blockchain processing apparatus. In this way, the rights defense detection service apparatus can perform detection on current latest digital content that has a copyright registered, to determine whether the digital content is an infringing production. In addition, the rights defense detection service apparatus sends the to-be-matched feature metadata and the rights-to-be-defended feature metadata to the rights defense detection client, so that the rights defense detection client downloads the content features and performs matching between the rights-to-be-defended content feature and the to-be-matched content feature segment, thereby reducing load of the rights defense detection service apparatus. For a more detailed description about this process, refer to an embodiment corresponding to FIG. 12A and FIG. 12B.

The process of a fourth type of copyright rights defense detection occurs after a digital content copyright registration process. Therefore, a rights defense detection service apparatus obtains to-be-matched feature metadata from a blockchain in a blockchain processing apparatus by using a copyright handling apparatus. The rights defense detection service apparatus downloads a to-be-matched content feature database from a feature based on to-be-matched feature metadata, and then performs a query of matching between the to-be-matched content feature and a stored rights-to-be-defended content feature. The rights defense detection service apparatus determines whether a copyright transaction corresponding to a successfully matched rights-to-be-defended content feature is the same as a copyright transaction corresponding to the to-be-matched content. If the copyright transaction corresponding to the successfully matched rights-to-be-defended content feature is the same as the copyright transaction corresponding to the to-be-matched content, it is considered that a registered to-be-matched copyright is infringing. In addition, the rights defense detection service apparatus further stores a detection report transaction including a detection result in a blockchain in a blockchain processing apparatus. In this way, the rights defense detection service apparatus can perform detection on current latest digital content that has a copyright registered, to determine whether the digital content is an infringing production. For a more detailed description about this process, refer to an embodiment corresponding to FIG. 13.

The following continues describing in detail the foregoing seven processes.

Figure 7:
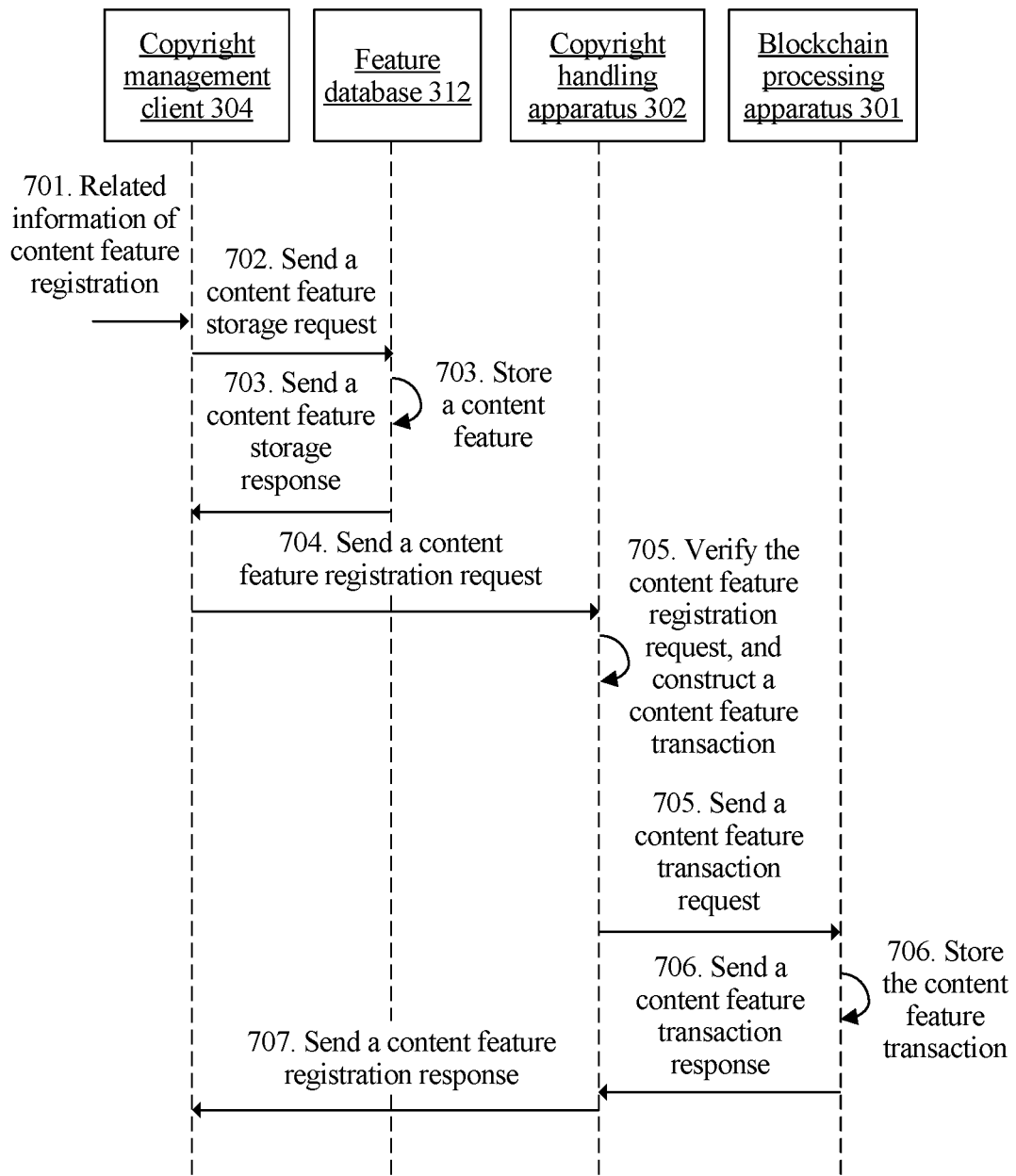
FIG. 7 is a schematic flowchart of a content feature registration process according to an embodiment of the present invention.

1. Content Feature Registration Process of a Rights-to-be-Defended Copyright:

As shown in FIG. 7, an embodiment of the present invention provides the content feature registration process of the rights-to-be-defended copyright, including the following steps.

701: A copyright management client receives a content feature registration command and related information of content feature registration that are entered by a copyright owner. The related information of content feature registration may include a copyright transaction ID, a digital content file, and a content feature extraction algorithm. The copyright management client extracts a content feature from the digital content file based on the content feature extraction algorithm, to obtain a size of the content feature. The copyright management client may further perform calculation on the content feature based on a hash algorithm, to obtain a content feature hash value. The content feature hash value can be used to uniquely determine a content feature. The copyright management client may further generate a pair of random public and private keys of an asymmetric encryption algorithm for the content feature. The public and private keys may be referred to as a content feature public key and a content feature private key herein. The copyright management client may store the content feature private key, to verify an identity of the copyright owner on a network.

702: The copyright management client sends a content feature storage request to a feature database, where the content feature storage request includes the content feature and the content feature hash value. The feature database may be a distributed database. A specific transmission protocol and a specific storage method of the distributed database are determined based on a technology used by the database, for example, IPFS uses a P2P transmission protocol that is based on DHT and BT and a file storage method that supports version control.

703: The feature database receives the content feature storage request sent by the copyright management client, stores the content feature, the content feature hash value, and a correspondence between the content feature and the content feature hash value, and sends a content feature storage response to the copyright management client, where the content feature storage response may include information about a storage failure or a storage success.

704: The copyright management client receives the content feature storage response, and after determining that content feature storage succeeds, sends a content feature registration request to a copyright handling apparatus.

The content feature registration request may include an address of a content feature owner, a copyright transaction ID, a private key signature of a copyright owner, and feature metadata. The address of the content feature owner may be generated by using the content feature public key, and the address is in a one-to-one correspondence with the content feature public key. The address may directly be the content feature public key or a hash value of the content feature public key. The feature metadata may include the content feature extraction algorithm and the content feature hash value, and may further include a digital content ID and the content feature size.

705: The copyright handling apparatus receives the content feature registration request, verifies the content feature registration request, and if the verification fails, sends a content feature registration response for the failure to the copyright management client. If the verification succeeds, the copyright handling apparatus constructs a content feature transaction based on the content feature registration request, sets a transaction identifier of a transaction currently bearing an asset and a signature of an asset owner that are in input content included in the content feature transaction respectively to a copyright transaction identifier and a private key signature of a copyright owner, sets an address in output content included in the content feature transaction to the address of the content feature owner, and sets asset data in the content feature transaction to the feature metadata. The copyright handling apparatus sends a content feature transaction request to a corresponding blockchain processing apparatus. A method for verifying the content feature registration request by the copyright handling apparatus is as follows:

(1) The copyright handling apparatus obtains a copyright transaction corresponding to the foregoing copyright transaction identifier, where if there is no copyright transaction corresponding to the foregoing copyright transaction identifier in a blockchain, the copyright handling apparatus fails to obtain the copyright transaction and the verification fails.

(2) The copyright handling apparatus verifies, by using the address included in the output content in the obtained copyright transaction, whether the private key signature of the copyright owner is valid, where if a verification result is invalid, the verification fails.

(3) If the feature metadata includes the digital content ID, the copyright handling apparatus verifies whether the digital content ID in the feature metadata is a subset of a digital content ID in the copyright transaction, where if the digital content ID in the feature metadata is not a subset of the digital content ID in the copyright transaction, the verification fails. This process is optional.

If the foregoing three verification processes are successful, the verification succeeds.

706: The blockchain processing apparatus receives the content feature transaction request, and stores the content feature transaction in a blockchain. A storage process is the same as a process of storing a transaction in a blockchain in the prior art, and details are not described herein. The blockchain processing apparatus further sends a content feature transaction response to the copyright handling apparatus, where the content feature transaction response includes a registration result and a content feature transaction ID.

707: The copyright handling apparatus receives the content feature transaction response, and sends a copyright registration response to the copyright management client.

In the foregoing process, an online process of the content feature registration on the Internet is implemented. The content feature transaction is persisted in the blockchain, to ensure that a result of the content feature registration cannot be tampered with and is trusted. In addition, control by the copyright owner on the content feature registration is implemented. The distributed feature database can meet requirements of the P2P copyright management client for high-performance, large-capacity, and reliable content feature storage and reading.

Figure 8:
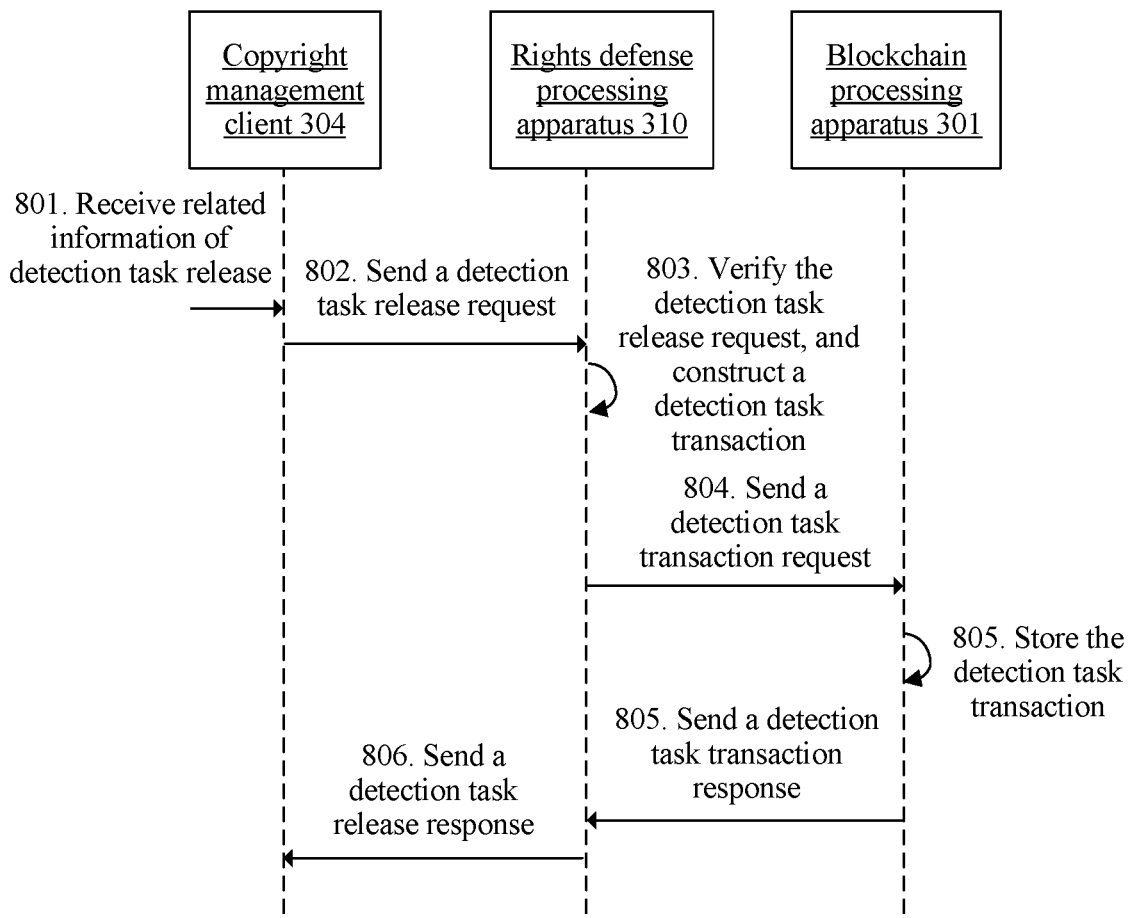
FIG. 8 is a schematic flowchart of a detection task release process according to an embodiment of the present invention.

2. Rights Defense Detection Task Release by a Copyright Owner:

As shown in FIG. 8, an embodiment of the present invention provides a rights defense detection task release process, including the following steps.

801: A copyright management client receives a detection task release command and related information of detection task release that are entered by a copyright owner. The related information of the detection task release includes a copyright transaction identifier, a rights defense detection incentive policy, and detection task execution information that are of a detection task that is specified to release. The rights defense detection incentive policy may be as follows: Based on the policy, an executor can obtain a corresponding incentive, for example, obtain virtual currency, after executing this detection task. The detection task execution information may be a valid task start time, a valid task end time, and the like.

802: The copyright management client sends a detection task release request to a rights defense processing apparatus. The detection task release request may include an address of a detection task owner, a copyright transaction identifier, a private key signature of a copyright owner, detection task execution information, and a detection task release time. The address of the detection task owner may be generated by using a detection task public key, and the address is in a one-to-one correspondence with the detection task public key. The address of the rights defense owner may directly be the detection task public key or a hash value of the detection task public key. The copyright management client generates a pair of random public and private keys of an asymmetric encryption algorithm for the detection task. The public and private keys may be referred to as a detection task public key and a detection task private key herein. The copyright management client may store and keep the private key secret, to verify an identity of the copyright owner on a network. The detection task release request may further include the rights defense detection incentive policy.

803: The rights defense processing apparatus receives the detection task release request, verifies the detection task release request, and if the verification fails, sends a detection task release response to the copyright management client; or if the verification succeeds, constructs a detection task transaction based on the detection task release request, sets a transaction ID of a transaction currently bearing an asset and a signature of an asset owner that are in input content included in the detection task transaction respectively to the copyright transaction identifier and the private key signature of the copyright owner, sets an address in output content to the address of the detection task owner, and sets asset data in the output content to detection task information, where the detection task information includes the detection task execution information and the detection task release time, and the detection task information may further include the rights defense detection incentive policy. The foregoing process of verifying the detection task release request includes:

(1) The rights defense processing apparatus obtains a copyright transaction corresponding to the copyright transaction identifier from a blockchain stored in a blockchain processing apparatus corresponding to the rights defense processing apparatus, and if there is no copyright transaction corresponding to the copyright transaction identifier in the blockchain, the rights defense processing apparatus fails to obtain the copyright transaction and the verification fails.

(2) The rights defense processing apparatus verifies, by using the address included in the output content in the obtained copyright transaction, whether the private key signature of the copyright owner is valid, and if a verification result is invalid, the verification fails.

If the foregoing verification processes are both successful, the detection task release request is successfully verified.

804: The rights defense processing apparatus sends a detection task transaction request including the detection task transaction to the corresponding blockchain processing apparatus.

805: The blockchain processing apparatus stores the detection task transaction in the blockchain. A storage process is the same as a process of storing a transaction in a blockchain in the prior art, and details are not described herein. The blockchain processing apparatus may further send a detection task transaction response to the rights defense processing apparatus, where the response includes a release result and a detection task transaction ID.

It should be noted that, the blockchain stored in the blockchain processing apparatus generally records the detection task transaction ID, detection task information, and an association relationship between a sequence number of a block in which the detection task transaction is located and an index position of the detection task transaction in the block. In the blockchain, a storage block is numbered based on a time sequence of writing in the blockchain. In one block, index positions in the block are sorted based on a time sequence of writing in the block. In other words, for two detection task transactions, a detection task transaction with a larger sequence number is latterly released, while a detection task transaction with a smaller sequence number is first released. For detection task transactions in one block, a detection task transaction with a larger index sequence number in the block is latterly released, while a detection task transaction with a smaller index position in the block is first released.

806: The rights defense processing apparatus receives the detection task transaction response. The rights defense processing apparatus stores a relationship between the detection task transaction ID and the copyright transaction ID, and sends the detection task release response to the copyright management client.

In the foregoing process, an online process of the detection task release on the Internet is implemented. The detection task transaction is persisted in the blockchain, to ensure that a result of the detection task release cannot be tampered with and is trusted. In addition, control by the copyright owner on the detection task release is implemented.

Figure 9:
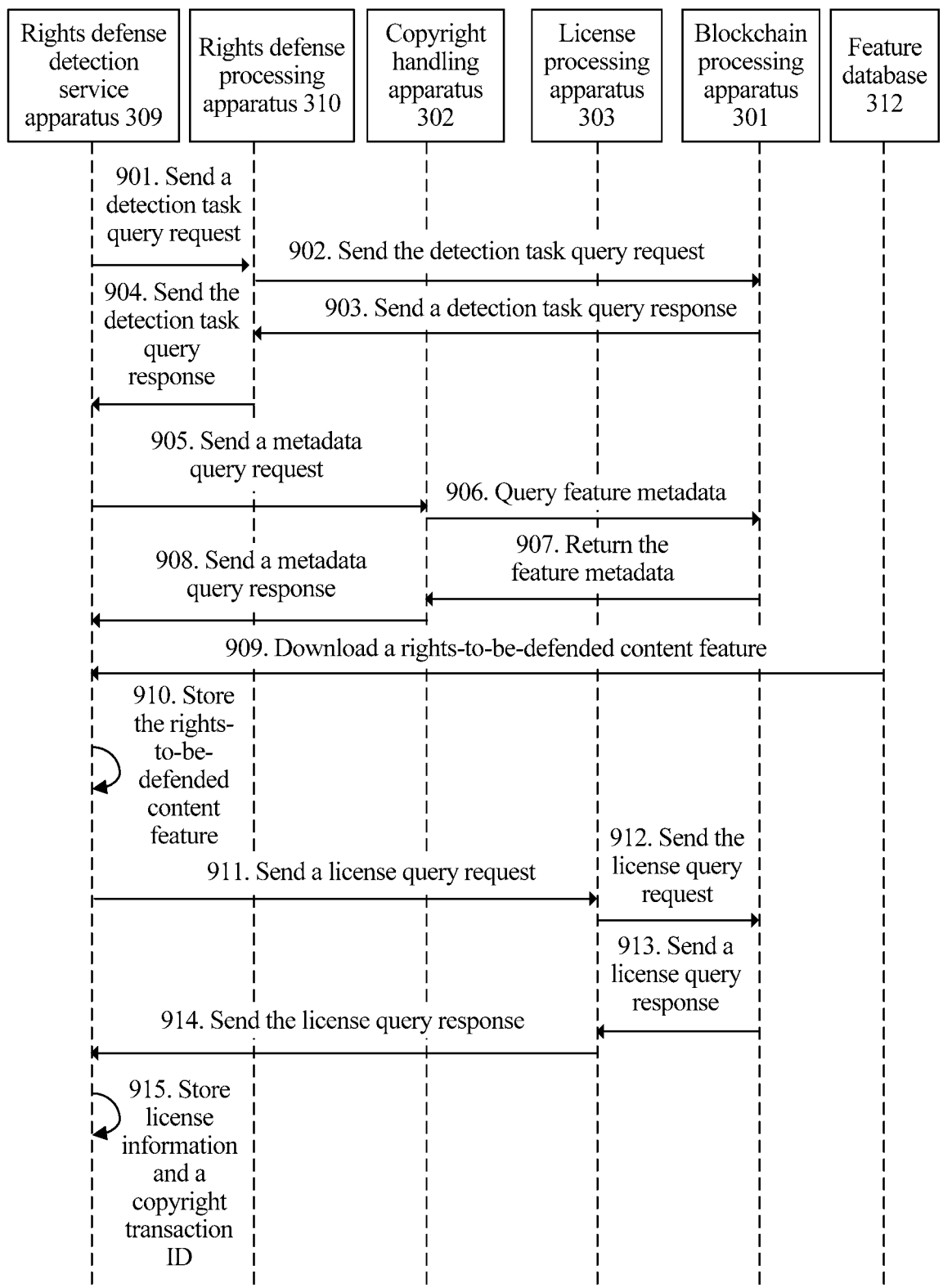
FIG. 9 is a schematic flowchart of a detection task initialization process according to an embodiment of the present invention.

3. Rights Defense Detection Task Initialization Process:

A rights defense detection service apparatus needs to query, in a scheduled manner from a blockchain stored in a blockchain processing apparatus, a latest detection task transaction, and a content feature and authorized license information that are required for executing rights defense detection work. As shown in FIG. 9, an embodiment of the present invention provides a process of obtaining a detection task, including the following steps.

901: The rights defense detection service apparatus sends a detection task query request to a rights defense processing apparatus, where the detection task query request includes a detection task transaction identifier.

902: The rights defense processing apparatus receives the detection task query request, and sends the detection task query request to a blockchain processing apparatus corresponding to the rights defense processing apparatus.

903: The blockchain processing apparatus queries a detection task transaction from a stored blockchain based on the detection task transaction identifier, and sends a detection task query response including one or more detection task transactions to the rights defense processing apparatus. A specific query method is as follows:

(1) If the detection task transaction ID is empty, all detection task transactions are returned to the rights defense processing apparatus.

(2) If the detection task transaction ID does not exist, a query failure response is returned to the rights defense processing apparatus.

(3) If the detection task transaction ID exists and is not empty, the blockchain processing apparatus first queries a block sequence number and an index sequence number in a block that are corresponding to the detection task transaction ID from the blockchain based on the detection task transaction ID in query criteria, and searches for a detection task transaction whose block sequence number is greater than the block sequence number or that has a block sequence number same as the block sequence number but has an index sequence number in the block greater than the index sequence number in the block; and returns a found detection task transaction to the rights defense processing apparatus.

The blockchain includes a plurality of blocks and each block includes a plurality of indexes. A smaller sequence number of a block indicates an earlier storage time of the block, while a larger sequence number of a block indicates a later storage time of the block. For a same block, a smaller index sequence number indicates an earlier storage time of an index, while a larger index sequence number indicates a later storage time of the index. Therefore, a detection task transaction recorded after a transaction corresponding to the detection task transaction identifier can be found by searching for the detection task transaction whose block sequence number is greater than the block sequence number or that has a block sequence number same as the block sequence number but has an index sequence number in the block greater than the index sequence number in the block.

904: The rights defense processing apparatus receives a detection task query response that is sent by the blockchain processing apparatus and that includes one or more detection task transactions, and sends the detection task query response to the rights defense detection processing apparatus.

The rights defense detection service apparatus receives the detection task query response. The rights defense detection service apparatus executes a processing process of steps 905 to 915 for each detection task transaction in the detection task query response.

905: The rights defense detection service apparatus sends a metadata query request to a copyright handling apparatus, where the metadata query request includes a detection task transaction ID.

Because the detection task query response may include a plurality of detection task transactions, the detection task transaction ID herein may be or may not be the detection task transaction ID included in the detection task query request in 901.

906: The copyright handling apparatus receives the metadata query request, and queries feature metadata corresponding to the detection task transaction ID based on the detection task transaction ID from a blockchain processing apparatus corresponding to the copyright handling apparatus.

907: The blockchain processing apparatus queries the feature metadata based on the detection task transaction ID, and sends the feature metadata to the copyright handling apparatus. A specific query method is as follows:

(1) If the detection task transaction ID in query criteria does not exist or is empty, the query fails and a metadata query response for the failure is returned.

(2) If the detection task transaction ID in query criteria exists and is not empty, the blockchain processing apparatus first queries a copyright transaction ID corresponding to the detection task transaction ID from the detection task transaction, queries a content feature transaction relevant to the copyright transaction ID based on the copyright transaction ID, and queries feature metadata corresponding to the copyright transaction ID from the content feature transaction.

908: The copyright handling apparatus sends a metadata query response to the rights defense detection service apparatus, where the metadata query response includes a correspondence between a detection task transaction ID and a copyright transaction ID and a correspondence between a copyright transaction ID and feature metadata.

The rights defense detection service apparatus stores the correspondence between a detection task transaction ID and a copyright transaction ID and the correspondence between a copyright transaction ID and feature metadata.

After receiving the feature metadata, the rights defense detection service apparatus executes a processing process of steps 909 and 910 for each piece of feature metadata.

909: The rights defense detection service apparatus downloads a rights-to-be-defended content feature from a feature database based on a content feature hash value in the feature metadata. In this embodiment of the present invention, a content feature downloaded from the feature database is referred to as a rights-to-be-defended content feature.

910: The rights defense detection service apparatus locally stores the rights-to-be-defended content feature and a correspondence between the rights-to-be-defended content feature and the feature metadata.

911: The rights defense detection service apparatus sends a license query request including a detection task transaction ID to a license processing apparatus.

912: The license processing apparatus receives the license query request, and sends the license query request to a corresponding blockchain processing apparatus, to query license information.

913: The blockchain processing apparatus receives the license query request, queries the license information based on the detection task transaction ID, and sends a license query response that includes valid license information and a corresponding copyright transaction ID to the license processing apparatus. A specific query method is as follows:

(1) If the detection task transaction ID in query criteria does not exist or is empty, the query fails and a query failure response is returned to the license processing apparatus.

(2) If the detection task transaction ID in query criteria exists and is not empty, the blockchain processing apparatus queries a copyright transaction ID corresponding to the detection task transaction ID from a stored blockchain, queries a license transaction corresponding to the copyright transaction ID based on the copyright transaction ID, and queries distribution constraint information of a license included in the license transaction, to obtain, by filtering, license information with a quantity of times of available distribution being greater than 0, a distribution start time being currently valid, and a distribution end time being currently valid.

914: The license processing apparatus receives the license query response, and sends the license query response to the rights defense detection service apparatus. The license query response includes the license information and the copyright transaction ID, where the license information includes a content distributor identifier or a consumer identifier, distribution constraint information, a distribution start time, and a distribution end time.

915: The rights defense detection service apparatus receives the query response sent by the license processing apparatus, and stores the license information, the copyright transaction ID, and a correspondence between the license information and the copyright transaction ID.

Figure 10A:
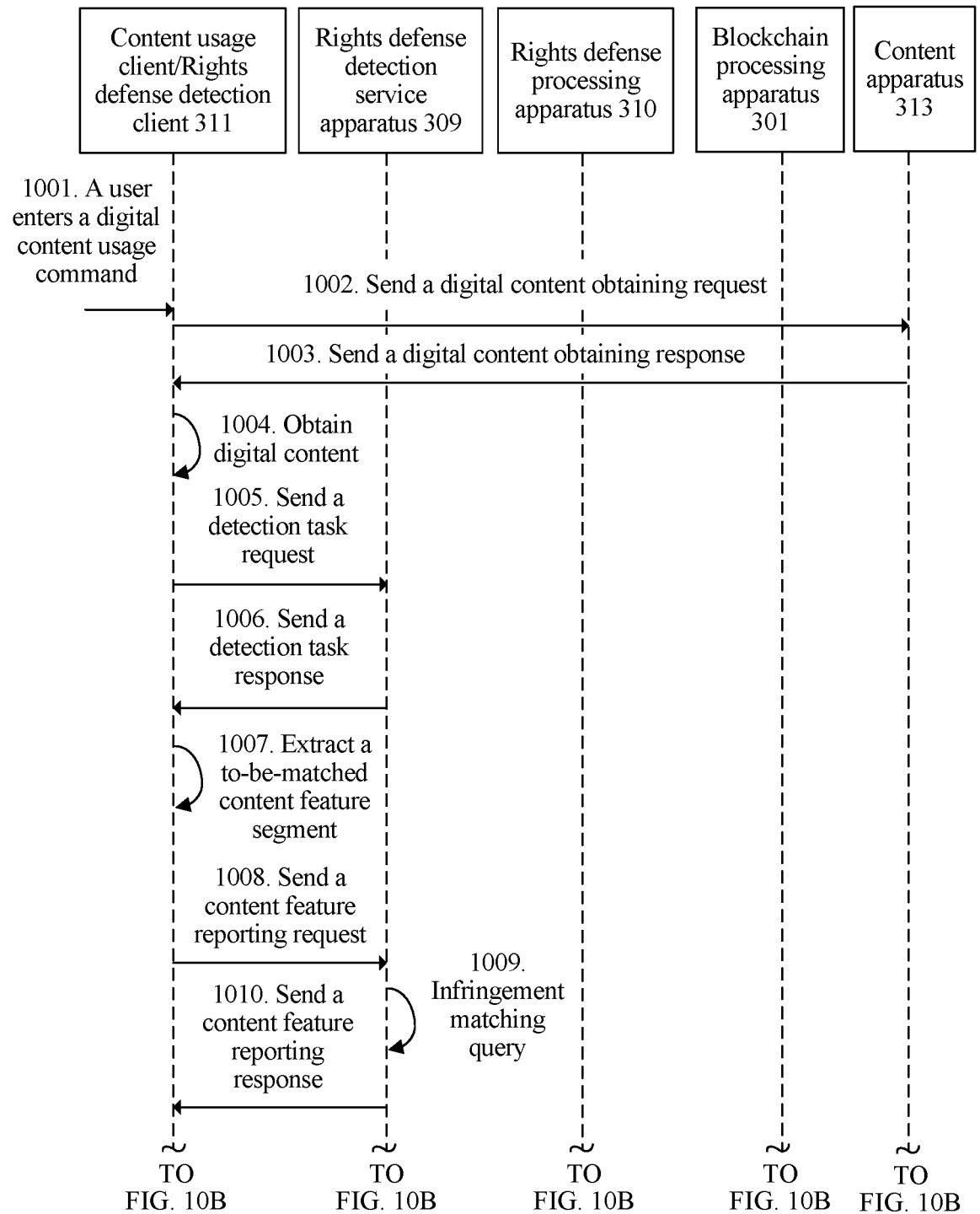
FIG. 10A and FIG. 10B are a schematic flowchart of a rights defense detection process according to an embodiment of the present invention.
Figure 10B:
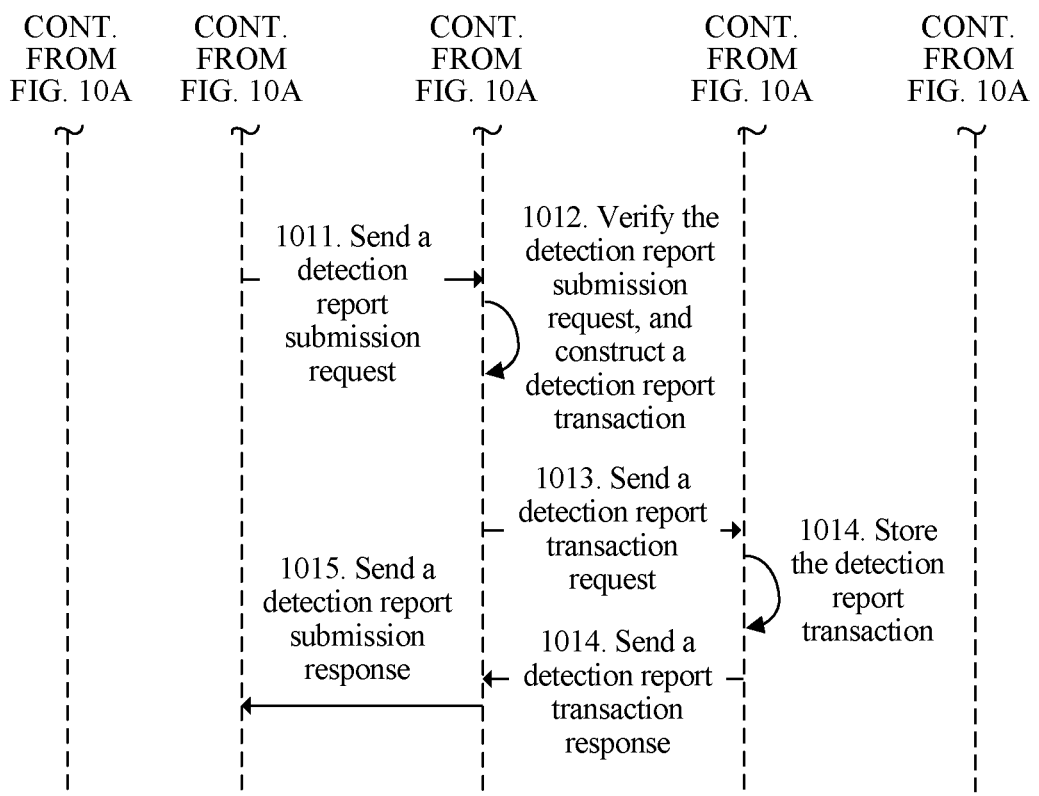

4. Application Scenario 1 of Digital Content Copyright Rights Defense Detection:

As shown in FIG. 10A and FIG. 10B, an embodiment of the present invention provides a detection task execution process. When consuming digital content, a terminal triggers a rights defense detection client to perform a rights defense detection process. In addition, a rights defense detection service apparatus executes the rights defense detection process, including the following steps.

1001: A content usage client receives a digital content usage command entered by a consumer.

1002: The content usage client sends a digital content obtaining request to a specified content apparatus, where the digital content request generally includes a content distribution identifier, and the content distribution identifier is an identifier used by a content distributor to specify content, for example, a link address of content.

1003: The content apparatus receives the digital content obtaining request, obtains digital content corresponding to the content distribution identifier, and sends a digital content obtaining response including the digital content to the content usage client.

1004: The content usage client receives the digital content obtaining response to obtain the digital content.

When consuming the digital content, for example, playing the digital content, the content usage client triggers a rights defense detection client to execute the following process. The rights defense detection client and the content usage client are integrated on a same terminal.

1005: The rights defense detection client sends a detection task request including the content distribution identifier to a rights defense detection service apparatus, where the detection task request may further include a user name and a password that are registered by the consumer with the rights defense detection service apparatus.

1006: The rights defense detection service apparatus receives the detection task request, allocates a detection task for the detection task request, and returns a detection task response to the rights defense detection client, where the detection task response includes a task allocation result, a sequence number of a to-be-matched content feature segment, and a segment size; and if the detection task request further includes the user name and the password that are registered by the consumer with the rights defense detection service apparatus, the rights defense detection service apparatus further needs to authenticate the rights defense detection client.

The rights defense detection service apparatus may assign only one rights defense detection client to perform detection on the digital content, or may assign a plurality of rights defense detection clients to perform detection on the data content. Generally, to improve digital content detection efficiency, the rights defense detection service apparatus may assign a plurality of rights defense detection clients to perform parallel detection on the data content.

Specifically, the rights defense detection service apparatus divides one piece of digital content into a plurality of to-be-matched content feature segments, and numbers the to-be-matched content feature segments. Specifically, the rights defense detection service apparatus may divide the digital content into segments based on a time period, for example, divide the digital content into segments of 10 seconds, or divide the digital content into segments based on a size of the digital content, for example, divide the digital content into segments of 1 MB. The rights defense detection server apparatus may allocate a detection task to the rights defense detection client. Each time a detection task is allocated, the rights defense detection service apparatus stores an association relationship between a content distribution identifier, a sequence number of an allocated to-be-matched content feature segment, and a detection task state. The detection task state herein may be ended or in-process. The rights defense detection service apparatus does not know a size or total duration of the digital content corresponding to the content distribution identifier. The rights defense detection service apparatus performs segmentation based on an agreed rule, and then the rights defense detection service client determines whether the segmentation ends, and notifies the rights defense detection service apparatus of a determining result.

When allocating a detection task to the rights defense detection client, the rights defense detection service apparatus first determines whether the content distribution identifier in the detection task request exists, and if the content distribution identifier does not exist, sets the sequence number of the to-be-matched content feature segment to 1, sets the segment size according to a preconfigured rule, and sets the task allocation result to successful; or if the content distribution identifier exists and a corresponding detection task state is in-progress, queries a maximum sequence number of an allocated to-be-matched content feature segment based on the content distribution identifier, sets the sequence number of the to-be-matched content feature segment to be equal to the maximum sequence number of the allocated to-be-matched content feature segment+1, sets the segment size according to a preconfigured rule, and sets the task allocation result to successful; or if the content distribution identifier in the detection task request exists and a corresponding detection task state is ended, sets the task allocation result to ended.

1007: The rights defense detection client performs the following processing based on the detection task response returned by the rights defense detection service apparatus:

(1) If the task allocation result is not a success, the process ends.

(2) If the task allocation result is a success, the rights defense detection client obtains content data of a corresponding segment based on the sequence number of the allocated to-be-matched content feature segment and the segment size (for example, for an audio/video, obtains audio/video data of a corresponding time segment), and extracts a content feature from the content data of the segment based on a content feature extraction algorithm, where the content feature is referred to as a to-be-matched content feature segment; and if the sequence number of the allocated to-be-matched content feature segment and the segment size fall within a range of the to-be-matched digital content, sets a content feature extraction result to be valid, or if the sequence number of the allocated to-be-matched content feature segment and the segment size fall beyond a range of the to-be-matched digital content, sets a content feature extraction result to be invalid.

1008: The rights defense detection client sends a content feature reporting request to the rights defense detection service apparatus. The content feature reporting request may include the content distribution identifier, the content feature extraction result, and a content distributor identifier. The content feature extraction result may be valid or invalid. If the content feature extraction result is valid, the content feature reporting request further includes the sequence number of the to-be-matched content feature segment and the to-be-matched content feature segment.

1009: After receiving the content feature reporting request and obtaining the to-be-matched content feature segment, the rights defense detection service apparatus performs an infringement matching query. A specific matching query process is as follows:

(1) If the content feature extraction result in the content feature reporting request is invalid, the detection task state corresponding to the content distribution identifier is set to ended, and the matching query process ends.

(2) If the content feature extraction result in the content feature reporting request is valid, matching is performed between the to-be-matched content feature segment and a stored rights-to-be-defended content feature. If the to-be-matched content feature is the same as one content feature in the stored rights-to-be-defended content feature, or a degree of a similarity between the to-be-matched content feature and one content feature in the stored rights-to-be-defended content feature is greater than a specified threshold, the matching succeeds. If a degree of a similarity between the to-be-matched content feature segment and each content feature in the stored rights-to-be-defended content feature is lower than the specified threshold, the matching fails, and the detection result is set to "non-infringing", and the matching query process ends.

(3) The rights defense detection service apparatus determines feature metadata corresponding to a successfully matched rights-to-be-defended content feature based on a stored correspondence between a rights-to-be-defended content feature and feature metadata, and determines a copyright transaction ID corresponding to the feature metadata based on a stored correspondence between feature metadata and a copyright transaction ID.

(4) The rights defense detection service apparatus queries license information corresponding to the copyright transaction ID in step 3 based on a stored correspondence between a copyright transaction ID and license information, and if a query result is empty, sets the detection result to "infringing"; or if a query result is not empty, further determines, based on the content distributor identifier, whether the license information includes a license of the content distributor identifier, and if a query result is empty, sets the detection result to "infringing"; or if a query result is not empty, determines whether a distribution constraint of the license corresponding to the content distributor identifier in the license information is valid, for example, whether a distribution start time and a distribution end time are currently valid, and if the distribution constraint of the license is invalid, sets the detection result to "infringing"; or if the distribution constraint of the license is valid, sets the detection result to authorized. The matching query process ends.

1010: After the matching query process is completed, the rights defense detection service apparatus sends a content feature reporting response to the rights defense detection client, where the content feature reporting response includes the detection result.

If the detection result is "infringing", steps 1011 to 1015 continue to be executed; otherwise, the process ends.

1011: The rights defense detection service apparatus sends a detection report submission request to a rights defense processing apparatus. The detection report submission request may include an address of a detection report asset owner, a detection report submission time, the content distribution identifier, a content feature transaction ID of infringed content, and a content feature matching degree. Each segment has a content feature matching degree. The detection report submission request may further include the sequence number of the to-be-matched content feature segment, the content distributor identifier, and a detection task transaction ID. The rights defense detection service apparatus stores an association relationship between a copyright transaction ID and a detection task transaction ID. The rights defense detection service apparatus queries a corresponding detection task transaction ID based on the copyright transaction ID obtained in the infringement matching query process in step 1009.

The rights defense detection service apparatus may generate a pair of random public and private keys of an asymmetric encryption algorithm for detection report submission. The public and private keys may be referred to as a detection report public key and a detection report private key herein. The rights defense detection service apparatus may store and keep the private key secret, to verify an identity of a detection report submitter on a network.

1012: The rights defense processing apparatus receives the detection report submission request and verifies the detection report submission request, and if the verification succeeds, constructs a detection report transaction based on the detection report submission request, sets each of a transaction ID of a transaction currently bearing an asset and a signature of an asset owner that are in input content included in the detection report transaction to be empty, sets an address in output content to the address of the detection report asset owner, and sets asset data in the output content in the detection report transaction to the detection report submission time, the content distribution identifier, the detection task transaction ID, and the content feature matching degree; and sends the detection report transaction to a blockchain processing apparatus corresponding to the rights defense processing apparatus. A verification method is as follows:

(1) The rights defense processing apparatus queries a detection report transaction ID corresponding to both the content distribution identifier and the detection task transaction ID from a blockchain stored in the blockchain processing apparatus corresponding to the rights defense processing apparatus. If the detection report transaction ID cannot be queried, the verification succeeds, or if the detection report transaction ID can be queried, it indicates that the detection report transaction has been recorded in the blockchain, and the verification fails. The blockchain stored in the blockchain processing apparatus stores an association relationship between the detection report transaction ID, the content distribution identifier, and the detection task transaction ID.

(2) The rights defense processing apparatus queries detection task execution information corresponding to the detection task transaction ID from the blockchain stored in the blockchain processing apparatus corresponding to the rights defense processing apparatus. If the detection task execution information is currently invalid (for example, a current time falls beyond a range between a valid task start time and a valid task end time), the verification fails. The blockchain processing apparatus stores an association relationship between the detection task transaction ID and the detection task execution information.

(3) If the verification fails, a detection report submission response for the failure is returned to the rights defense detection service apparatus.

1013: The rights defense processing apparatus sends a detection report transaction request including the detection report transaction to the blockchain processing apparatus.

1014: The blockchain processing apparatus receives the detection report transaction request, and stores the detection report transaction in the blockchain. A storage process is the same as a process of storing a transaction in a blockchain in the prior art, and details are not described herein. The blockchain processing apparatus further sends a detection report transaction response to the rights defense processing apparatus, where the detection report transaction response includes the detection result and the detection report transaction ID.

1015: The rights defense processing apparatus sends the detection report submission response to the rights defense detection service apparatus.

In the foregoing process, through coordination between many rights defense detection services and rights defense detection clients worldwide, comprehensive rights defense detection coverage is implemented for content distributed by content distribution channels on the Internet, thereby more effectively and more quickly finding copyright infringement behavior scattered on the Internet.

Figure 11A:
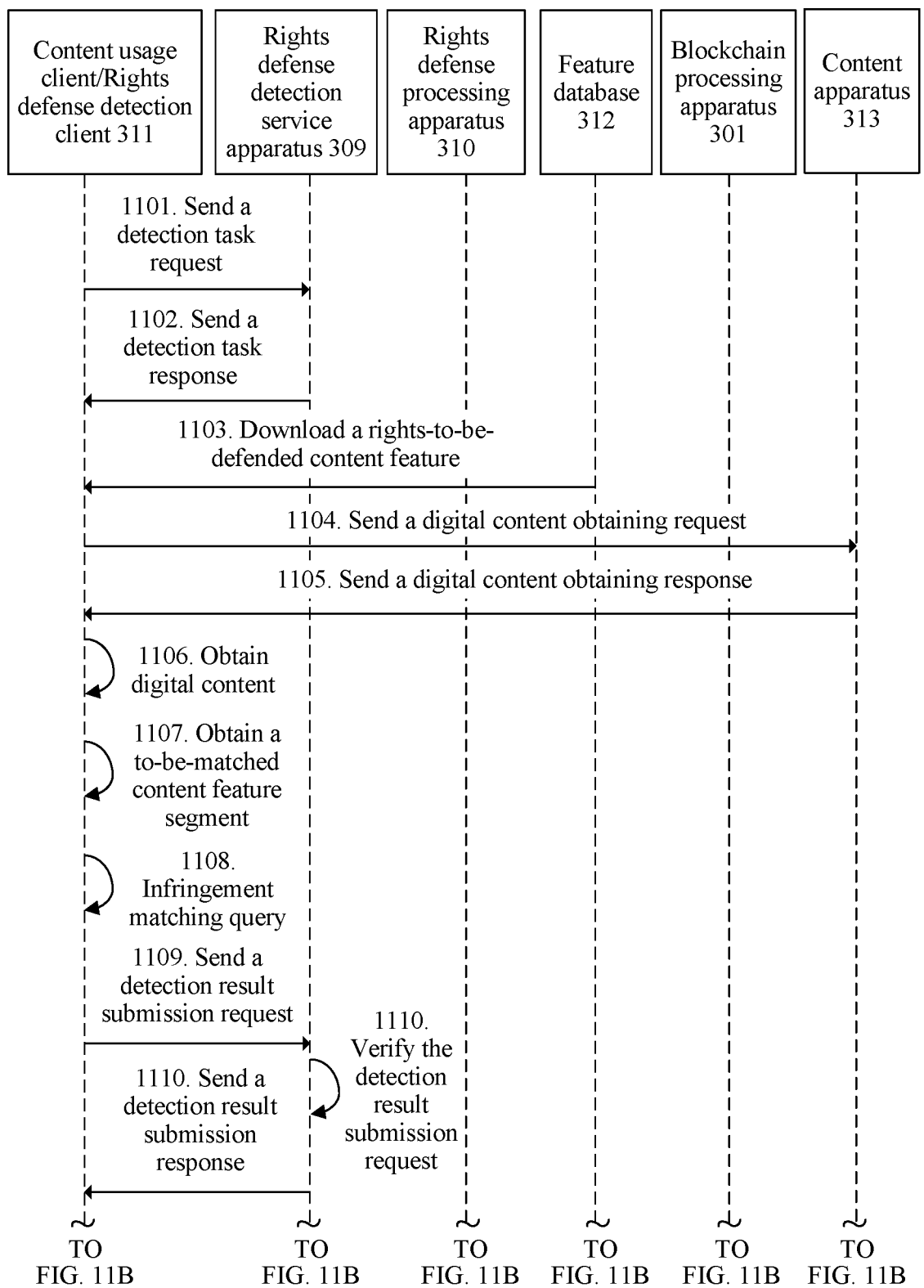
FIG. 11A and FIG. 11B are a schematic flowchart of another rights defense detection process according to an embodiment of the present invention.
Figure 11B:
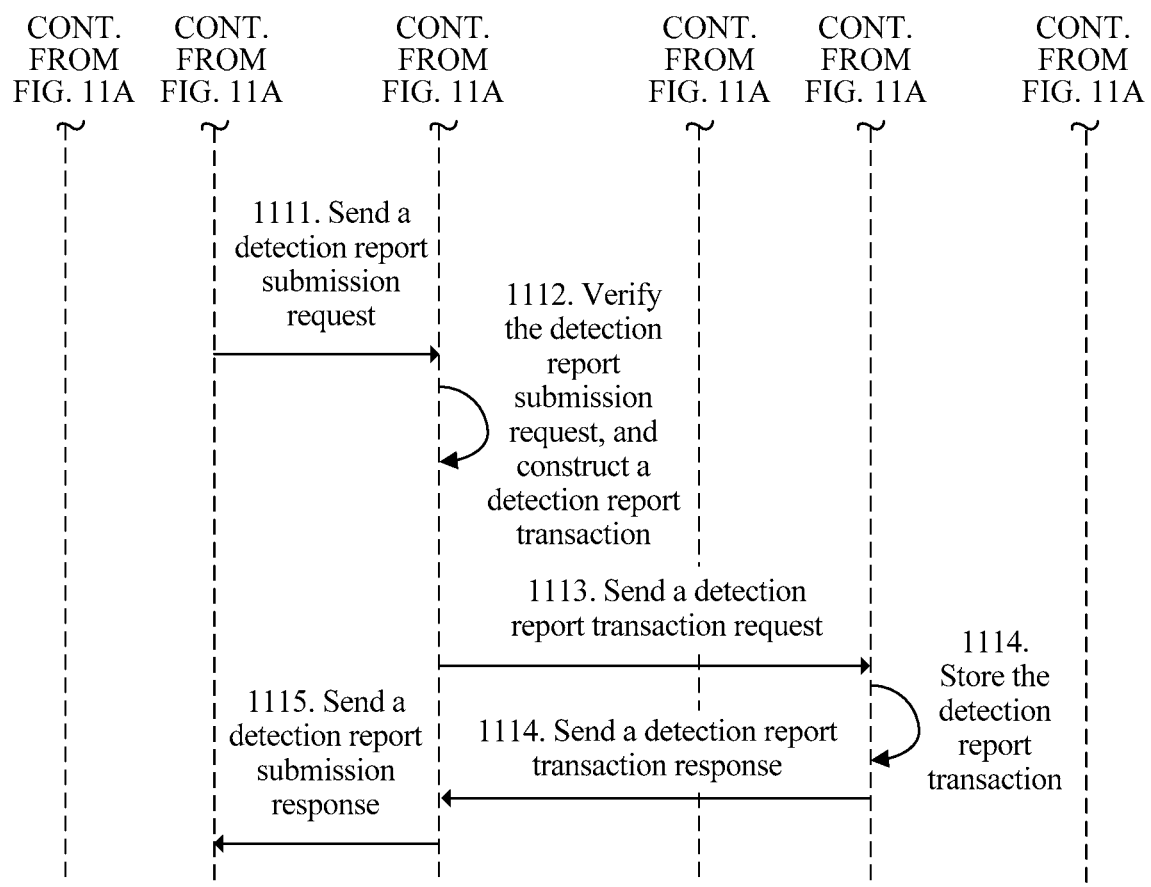

4. Application Scenario 2 of Digital Content Rights Defense Detection:

As shown in FIG. 11A and FIG. 11B, an embodiment of the present invention provides a detection task execution process. In the process, a rights defense detection client executes current rights defense detection. The process includes the following steps.

1101: The rights defense detection client may send a detection task request to a rights defense detection service apparatus in a scheduled manner. The detection task request may include a quantity of detection tasks that are requested to be allocated, and the detection task request may further include a user name and a password that are registered by a consumer with the rights defense detection service apparatus.

1102: The rights defense detection service apparatus receives the detection task request, allocates a detection task for the request, and returns a detection task response to the rights defense detection client. The detection task response includes a list of allocated detection tasks and feature metadata corresponding to the detection tasks. The rights defense detection service apparatus may allocate tasks based on different policies, for example, allocate each detection task to an equal quantity of rights defense detection clients, or proportionally allocate each detection task to different quantities of rights defense detection clients based on detection task incentives.

1103: The rights defense detection client downloads a rights-to-be-defended content feature from a feature database based on the feature metadata in the detection task response, and locally stores the rights-to-be-defended content feature.

Steps 1104 to 1106 are the same as steps 1002 to 1004. In addition, there is no determined sequence between step 1104 to step 1106 and step 1101 to step 1103. Steps 1101 to 1103 may be executed before steps 1104 to 1106. Alternatively, steps 1104 to 1106 may be executed before steps 1101 to 1103.

1107: The rights defense detection client extracts a content feature from the to-be-matched digital content based on a content feature extraction algorithm. This content feature is referred to as a to-be-matched content feature segment.

1108: The rights defense detection client performs a query of matching between the to-be-matched content feature segment and a rights-to-be-defended content feature.

The rights defense detection client performs matching between the to-be-matched content feature segment and the stored rights-to-be-defended content feature. When the to-be-matched content feature is the same as one content feature in the stored rights-to-be-defended content feature, or a degree of a similarity between the to-be-matched content feature and one content feature in the stored rights-to-be-defended content feature is greater than a specified threshold, the matching succeeds. If a degree of a similarity between the to-be-matched content feature segment and each content feature in the stored rights-to-be-defended content feature is lower than the specified threshold, the matching fails.

1109: After the matching succeeds, the rights defense detection client sends a detection report submission request to the rights defense detection service apparatus. The detection report submission request may include an address of a detection report asset owner, a detection report submission time, the content distribution identifier, a successfully matched content feature, and a content feature matching degree. The detection report submission request may further include a content distributor identifier, and a user name and a password that are registered by the consumer with the rights defense detection service apparatus.

1110: The rights defense detection service apparatus receives the detection report submission request, verifies the detection report submission request, and returns a detection result submission response to the rights defense detection client based on a detection result, where the detection result submission response includes the detection result. A method for verifying the detection report submission request is as follows:

The rights defense detection service apparatus determines feature metadata corresponding to a successfully matched rights-to-be-defended content feature based on a stored correspondence between a rights-to-be-defended content feature and feature metadata, and determines a copyright transaction ID corresponding to the feature metadata based on a stored correspondence between feature metadata and a copyright transaction ID.

The rights defense detection service apparatus queries license information corresponding to the copyright transaction ID based on a stored correspondence between a copyright transaction ID and license information, and if a query result is empty, sets the detection result to "infringing"; or if a query result is not empty, further determines, based on the content distributor identifier, whether the license information includes a license of the content distributor identifier, and if a query result is empty, sets the detection result to "infringing"; or if a query result is not empty, determines whether a distribution constraint of the license corresponding to the content distributor identifier in the license information is valid, for example, whether a distribution start time and a distribution end time are currently valid, and if the distribution constraint of the license is invalid, sets the detection result to "infringing"; or if the distribution constraint of the license is valid, sets the detection result to authorized. The matching query process ends.

If the detection result is "infringing", steps 1111 to 1115 continue to be executed; otherwise, the process ends. Steps 1111 to 1115 are the same as steps 1011 to 1015 in the previous process.

Figure 12A:
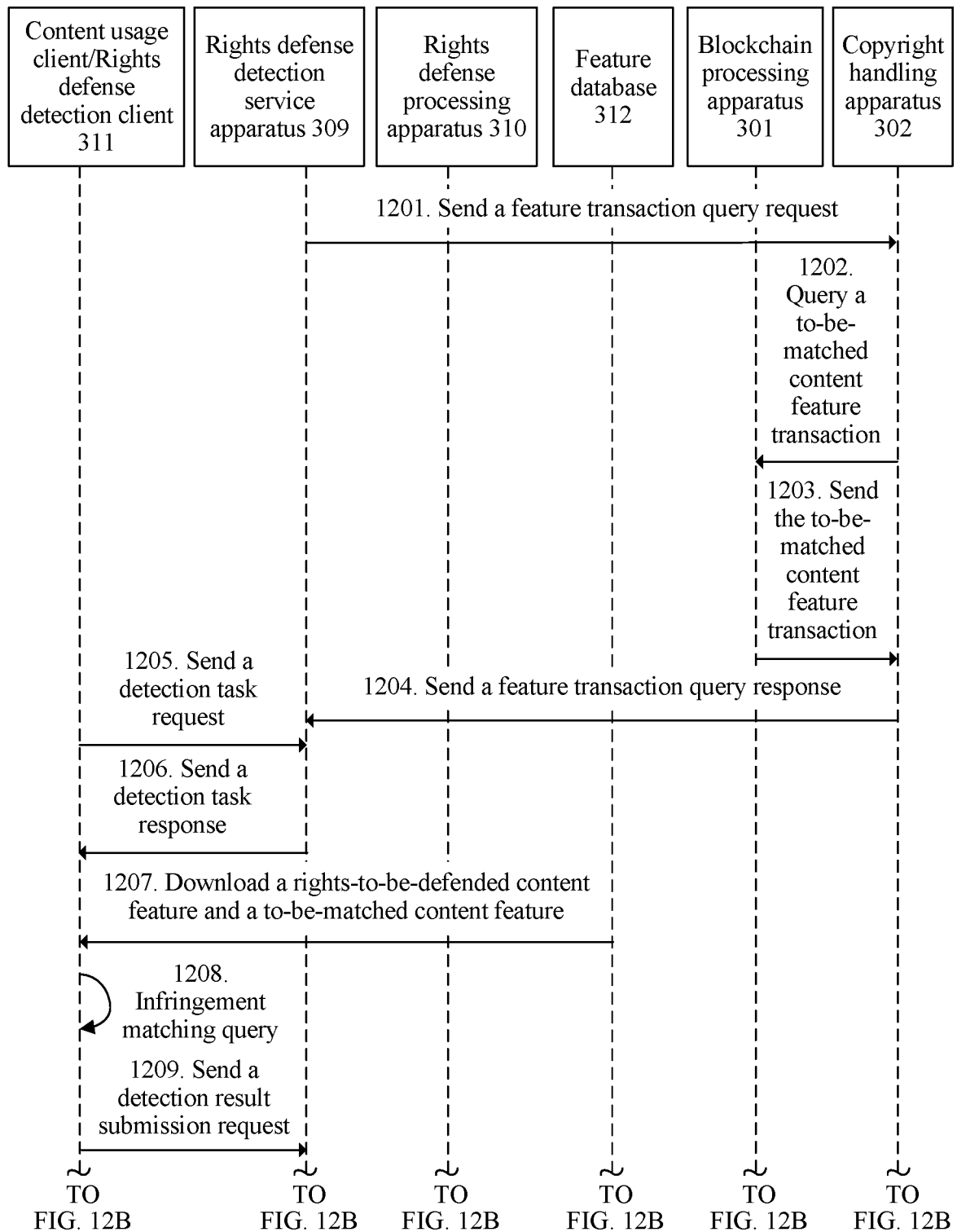
FIG. 12A and FIG. 12B are a schematic flowchart of another rights defense detection process according to an embodiment of the present invention.
Figure 12B:
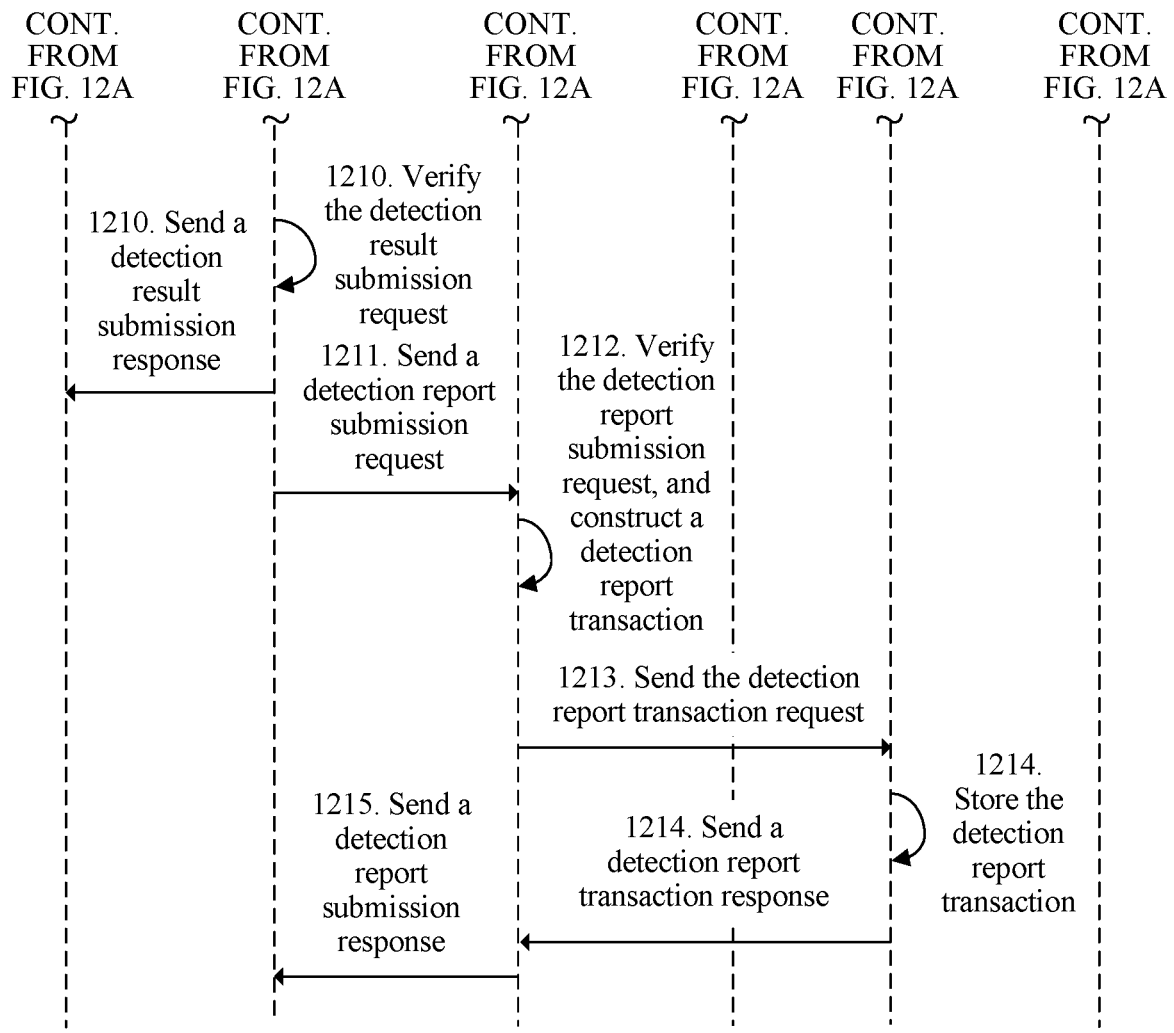

6. Application Scenario 3 of Digital Content Rights Defense Detection:

As shown in FIG. 12A and FIG. 12B, an embodiment of the present invention provides a rights defense detection task execution process. This process is dedicated for rights defense detection on digital content that has a copyright registered in a blockchain. After the copyright of the digital content is registered in the blockchain, a copyright owner may extract a content feature from the digital content by using a copyright client, and stores the content feature in a feature database. A detailed process of registering a content feature transaction in a blockchain in a blockchain processing apparatus is the process of content feature registration in FIG. 7. A rights defense detection service apparatus may obtain new content feature transactions from a blockchain processing apparatus periodically or in a scheduled manner. These new content feature transactions are usually unverified content features, and certainly may also be rights-to-be-defended content. This process includes steps 1201 to 1204.

1201: The rights defense detection service apparatus sends a feature transaction query request to a copyright handling apparatus. The feature transaction query request includes a content feature transaction ID. If the content feature transaction ID is empty, all content feature transactions are queried. If the content feature transaction ID is not empty, a content feature transaction recorded after a transaction corresponding to the content feature transaction ID is queried.

1202: The copyright handling apparatus receives the feature transaction query request, and sends the feature transaction query request to a corresponding blockchain processing apparatus.

1203: The blockchain processing apparatus queries a content feature transaction based on the feature transaction query request, and sends one or more queried content feature transactions to the copyright handling apparatus. A specific query method is as follows:

(1) If the feature transaction query request does not include the content feature transaction ID, all content feature transactions are returned.

(2) If the content feature transaction ID included in the feature transaction query request does not exist, a query failure response is returned.

(3) If the content feature transaction ID included in the feature transaction query request exists and is not empty, because a blockchain in the blockchain processing apparatus stores an association relationship between a content feature transaction ID, a sequence number of a block in which a content feature transaction is located, and an index position of a content feature in a block, the blockchain processing apparatus first queries a block sequence number corresponding to the content feature transaction and an index sequence number of the content feature transaction in a block based on the content feature transaction ID, and then searches for a content feature transaction whose block sequence number is greater than the block sequence number or that has a block sequence number same as the block sequence number but has an index sequence number in the block greater than the index sequence number in the block.

1204: The copyright handling apparatus receives a feature transaction query response including one or more content feature transactions, and sends the feature transaction query response to the rights defense detection service apparatus.

The rights defense detection service apparatus receives the feature transaction query response and stores the one or more to-be-matched content feature transactions.

At this time, the rights defense detection service apparatus waits for a rights defense detection task request of the rights defense detection client.

1205: The rights defense detection client sends a detection task request to the rights defense detection service apparatus, where the detection task request includes a quantity of rights defense detection tasks that are requested to be allocated and a quantity of to-be-detected content features that are requested to be allocated.

1206: The rights defense detection service apparatus receives the detection task request, allocates a detection task for the detection task request, and returns a detection task response to the rights defense detection client. The detection task response includes a list of allocated detection tasks, rights-to-be-defended feature metadata corresponding to the detection tasks, and to-be-matched feature metadata. The rights defense detection service apparatus may allocate tasks based on different policies, for example, allocate each detection task to an equal quantity of rights defense detection clients, or proportionally allocate each detection task to different quantities of rights defense detection clients based on detection task incentives. The rights defense detection service apparatus allocates rights defense tasks based on the quantities are in the request, namely, the quantity of rights defense detection tasks that are requested to be allocated and the quantity of to-be-detected content features that are requested to be allocated, and ensures that combinations of a rights defense detection task and a to-be-detected content feature are all covered.

1207: The rights defense detection client receives the detection task response, downloads a rights-to-be-defended content feature from a feature database based on the rights-to-be-defended feature metadata, and downloads a to-be-matched content feature database from the feature database based on the to-be-matched feature metadata.

1208: The rights defense detection client performs matching by using the to-be-matched content feature and the rights-to-be-defended content feature. If a degree of a similarity between the to-be-matched content feature and each content feature in the stored rights-to-be-defended content feature is lower than a foregoing specified threshold, the matching fails. If the to-be-matched content feature is the same as one content feature in the stored rights-to-be-defended content feature, or a degree of a similarity between the to-be-matched content feature and one content feature in the stored rights-to-be-defended content feature is greater than the specified threshold, the matching succeeds. After the matching succeeds, the rights defense detection client sends a detection report submission request to the rights defense detection service apparatus. The detection report submission request may include an address of a detection report asset owner, a detection report submission time, a content distribution identifier, a to-be-matched content feature, a rights-to-be-defended content feature, and a content feature matching degree. The detection report submission request may further include a content distributor identifier, and a user name and a password that are registered by a consumer with the rights defense detection service apparatus.

1210: The rights defense detection service apparatus receives the detection report submission request, verifies the detection report submission request, and returns a detection result submission response to the rights defense detection client based on a detection result, where the detection result submission response includes the detection result. A method for verifying the detection report submission request is as follows:

The rights defense detection service apparatus determines feature metadata corresponding to a successfully matched rights-to-be-defended content feature based on a stored correspondence between a rights-to-be-defended content feature and feature metadata, and determines a copyright transaction ID corresponding to the rights-to-be-defended feature metadata based on a stored correspondence between feature metadata and a copyright transaction ID.

The rights defense detection service apparatus determines feature metadata corresponding to a successfully matched to-be-matched content feature based on a stored correspondence between a to-be-matched content feature and feature metadata, and determines a copyright transaction ID corresponding to the to-be-matched feature metadata based on a stored correspondence between feature metadata and a copyright transaction ID.

The rights defense detection service apparatus determines whether a copyright transaction ID corresponding to the to-be-matched feature metadata is the same as a copyright transaction ID corresponding to the rights-to-be-defended feature metadata; and if the copyright transaction ID corresponding to the to-be-matched feature metadata is the same as the copyright transaction ID corresponding to the rights-to-be-defended feature metadata, determines that a rights defense detection result is "infringing", or if the copyright transaction ID corresponding to the to-be-matched feature metadata is different from the copyright transaction ID corresponding to the rights-to-be-defended feature metadata, determines that a rights defense detection result is "non-infringing".

If the detection result is "infringing", steps 1211 to 1215 continue to be executed; otherwise, the process ends.

1211: The rights defense detection service apparatus sends a detection report submission request to a rights defense processing apparatus. The detection report submission request may include the address of the detection report asset owner, the detection report submission time, a copyright transaction ID of infringed content, a detection task transaction ID, and the content feature matching degree. The rights defense detection service apparatus stores an association relationship between a copyright transaction ID and a detection task transaction ID. The rights defense detection service apparatus queries a corresponding detection task transaction ID based on a detected identical copyright transaction ID.

The rights defense detection service apparatus may generate a pair of random public and private keys of an asymmetric encryption algorithm for detection report submission. The public and private keys may be referred to as a detection report public key and a detection report private key herein. The rights defense detection service apparatus may store and keep the private key secret, to verify an identity of a detection report submitter on a network.

1212: The rights defense processing apparatus receives the detection report submission request and verifies the detection report submission request, and if the verification succeeds, constructs a detection report transaction based on the detection report submission request, sets each of a transaction ID of a transaction currently bearing an asset and a signature of an asset owner that are in input content included in the detection report transaction to be empty, sets an address in output content to the address of the detection report asset owner, and sets asset data in the output content in the detection report transaction to the detection report submission time, the copyright transaction ID, the detection task transaction ID, and the content feature matching degree; and sends the detection report transaction to a blockchain processing apparatus corresponding to the rights defense processing apparatus. A verification method is as follows:

(1) The rights defense processing apparatus queries a detection report transaction ID corresponding to both the copyright transaction ID and the detection task transaction ID from a blockchain stored in the blockchain processing apparatus corresponding to the rights defense processing apparatus. If the detection report transaction ID cannot be queried, the verification succeeds, or if the detection report transaction ID can be queried, it indicates that the detection report transaction has been recorded in the blockchain, and the verification fails.

Steps 1213 to 1215 are the same as steps 1013 to 1015.

Figure 13:
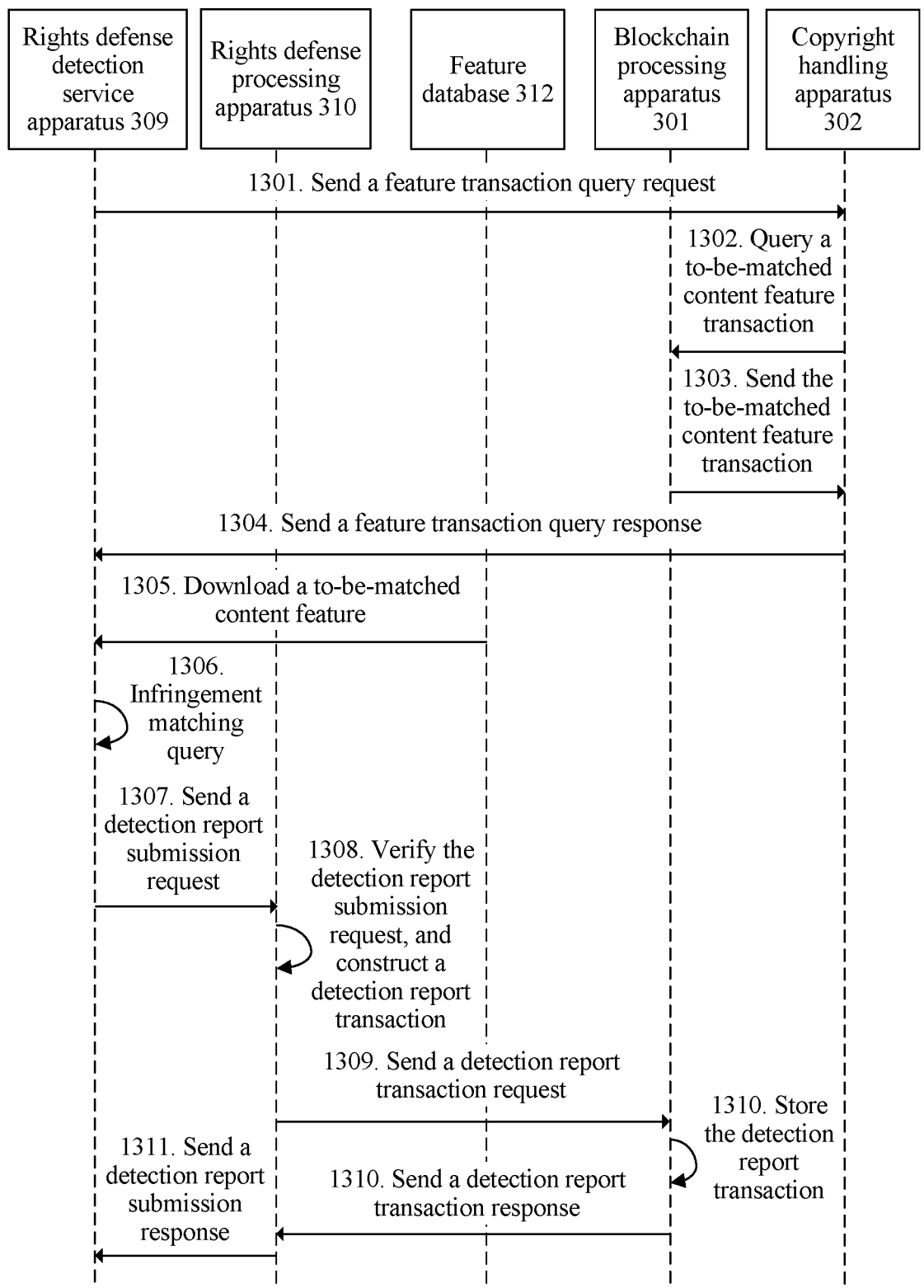
FIG. 13 is a schematic flowchart of another rights defense detection process according to an embodiment of the present invention.

7. Application Scenario 4 of Digital Content Rights Defense Detection:

As shown in FIG. 13, an embodiment of the present invention provides a rights defense detection task execution process. This process is dedicated for rights defense detection on digital content that has a copyright registered in a blockchain. In this process, a rights defense detection service apparatus implements a rights defense detection process, without requiring participation of a rights defense detection client. A specific process includes the following steps.

Steps 1301 to 1304 are the same as steps 1201 to 1204.

1305: The rights defense detection service apparatus downloads a to-be-matched content feature database from a feature database based on to-be-matched feature metadata.

1306: The rights defense detection service apparatus performs a query of infringement matching between the to-be-matched content feature and a stored rights-to-be-defended content feature. A specific matching query process is as follows:

The rights defense detection service apparatus performs matching by using the to-be-matched content feature and the rights-to-be-defended content feature. If a degree of a similarity between the to-be-matched content feature and each content feature in the stored rights-to-be-defended content feature is lower than a foregoing specified threshold, the matching fails. If the to-be-matched content feature is the same as one content feature in the stored rights-to-be-defended content feature, or a degree of a similarity between the to-be-matched content feature and one content feature in the stored rights-to-be-defended content feature is greater than the specified threshold, the matching succeeds.

After the matching succeeds, the rights defense detection service apparatus determines feature metadata corresponding to a successfully matched rights-to-be-defended content feature based on a stored correspondence between a rights-to-be-defended content feature and feature metadata, and determines a copyright transaction ID corresponding to the rights-to-be-defended feature metadata based on a stored correspondence between feature metadata and a copyright transaction ID.

The rights defense detection service apparatus determines feature metadata corresponding to a successfully matched to-be-matched content feature based on a stored correspondence between a to-be-matched content feature and feature metadata, and determines a copyright transaction ID corresponding to the to-be-matched feature metadata based on a stored correspondence between feature metadata and a copyright transaction ID.

The rights defense detection service apparatus determines whether a copyright transaction ID corresponding to the to-be-matched feature metadata is the same as a copyright transaction ID corresponding to the rights-to-be-defended feature metadata; and if the copyright transaction ID corresponding to the to-be-matched feature metadata is the same as the copyright transaction ID corresponding to the rights-to-be-defended feature metadata, determines that a rights defense detection result is "infringing", or if the copyright transaction ID corresponding to the to-be-matched feature metadata is different from the copyright transaction ID corresponding to the rights-to-be-defended feature metadata, determines that a rights defense detection result is "non-infringing".

If the detection result is "infringing", steps 1307 to 1311 continue to be executed; otherwise, the process ends.

Steps 1307 to 1311 are the same as steps 1211 to 1215.

In the foregoing process, through coordination between many rights defense detection services and rights defense detection clients worldwide, comprehensive rights defense detection coverage is implemented for content distributed by content distribution channels on the Internet, thereby more effectively and more quickly finding copyright infringement behavior scattered on the Internet.

Figure 14:
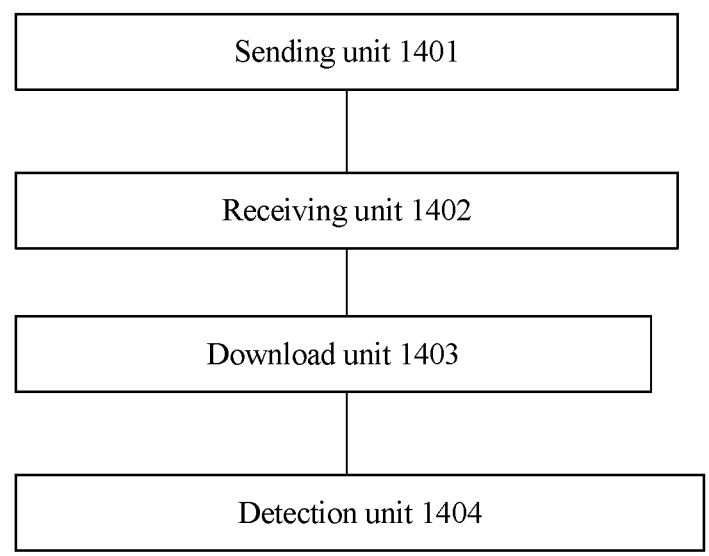
FIG. 14 is a schematic structural diagram of a rights defense detection service apparatus according to an embodiment of the present invention.

As shown in FIG. 14, a rights defense detection service apparatus according to an embodiment of the present invention that is implemented by a computer includes: a sending unit 1401, configured to send a metadata query request to a copyright handling apparatus, where the metadata query request includes a detection task transaction identifier; a receiving unit 1402, configured to receive a metadata query response that is sent by the copyright handling apparatus and that includes feature metadata, where the feature metadata is obtained by the copyright handling apparatus based on the detection task transaction identifier from a blockchain stored in a blockchain processing apparatus; a download unit 1403, configured to obtain a content feature corresponding to the feature metadata from a feature database, where the content feature is a rights-to-be-defended content feature; where the sending unit 1401 is further configured to send a license query request to a license processing apparatus, where the license query request includes the detection task transaction identifier; and the receiving unit 1402 is further configured to receive a license query response that is sent by the license processing apparatus and that includes license information, where the license information is obtained by the license processing apparatus based on the detection task transaction identifier from a blockchain stored in a blockchain processing apparatus; and a detection unit 1404, configured to perform rights defense detection for a copyright based on the obtained rights-to-be-defended content feature and the license information.

Further, the detection unit 1404 is specifically configured to receive a detection task request sent by a rights defense detection client, where the detection task request includes a content distribution identifier; allocate a rights defense detection task to the rights defense detection client based on the content distribution identifier; send a detection task response to the rights defense detection client, where the detection task response includes a task allocation result, a sequence number of a to-be-matched content feature segment, and a segment size; receive a content feature reporting request sent by the rights defense detection client, where the content feature reporting request includes the content distribution identifier, a content feature extraction result, the sequence number of the to-be-matched content feature segment, and a to-be-matched content feature segment; perform matching based on the to-be-matched content feature segment and the rights-to-be-defended content feature, to obtain a matching result; and perform, based on the license information, rights defense detection for a copyright corresponding to a to-be-matched content feature whose matching result indicates a success.

Further, when allocating a rights defense detection task to the rights defense detection client based on the content distribution identifier, the detection unit 1404 is specifically configured to determine whether the content distribution identifier exists, and if the content distribution identifier does not exist, set the sequence number of the to-be-matched content feature segment to 1, set the segment size according to a preconfigured rule, and set the task allocation result to successful; or if the content distribution identifier exists and a corresponding detection task state is in-progress, query a maximum sequence number of an allocated to-be-matched content feature segment based on the content distribution identifier, set the sequence number of the to-be-matched content feature segment to be equal to the maximum sequence number of the allocated to-be-matched content feature segment+1, set the segment size according to a preconfigured rule, and set the task allocation result to successful; or if the content distribution identifier in the detection task request exists and a corresponding detection task state is ended, set the task allocation result to ended.

Further, the detection unit 1404 is specifically configured to receive a detection report submission request from a rights defense detection client, where the detection report submission request includes an address of a detection report asset owner, a detection report submission time, a content distribution identifier, a successfully matched content feature, and a content feature matching degree; and perform, based on the license information, rights defense detection for a copyright corresponding to a to-be-matched content feature whose matching result indicates a success.

Further, when performing, based on the license information, rights defense detection for a copyright corresponding to a to-be-matched content feature whose matching result indicates a success, the detection unit 1404 is specifically configured to obtain, based on a stored association relationship between a content feature and a content feature transaction ID, a content feature transaction ID corresponding to the to-be-matched content feature whose matching result indicates a success; obtain, based on a stored association relationship between a content feature transaction ID and a copyright transaction ID, a copyright transaction ID corresponding to the content feature transaction ID; and if license information corresponding to the copyright transaction ID is empty, determine, based on a stored correspondence between a copyright transaction ID and license information, that a rights defense detection result is "infringing"; or if license information corresponding to the copyright transaction ID is not empty, determine whether a distribution constraint of a license included in the license information is valid; and if the distribution constraint of the license is invalid, determine that a rights defense detection result is "infringing", or if the distribution constraint of the license is valid, determine that a rights defense detection result is "non-infringing".

Further, the sending unit 1401 is further configured to send a detection report submission request to a rights defense processing apparatus, where the detection report submission request includes an address of a detection report asset owner, a detection report submission time, a content distribution identifier, a content feature transaction ID of infringed content, the detection task transaction ID, and a content feature matching degree.

Further, the detection unit 1406 is specifically configured to obtain to-be-matched feature metadata from the blockchain processing apparatus corresponding to the copyright handling apparatus; obtain a to-be-matched content feature from the feature database based on the to-be-matched feature metadata; perform matching based on a to-be-matched content feature segment and the rights-to-be-defended content feature, to obtain a matching result; and when the matching result indicates a success, determine whether a copyright transaction identifier corresponding to the to-be-matched feature metadata is the same as a copyright transaction identifier corresponding to rights-to-be-defended feature metadata; and if the copyright transaction identifier corresponding to the to-be-matched feature metadata is the same as the copyright transaction identifier corresponding to the rights-to-be-defended feature metadata, determine that a rights defense detection result is "infringing", or if the copyright transaction identifier corresponding to the to-be-matched feature metadata is different from the copyright transaction identifier corresponding to the rights-to-be-defended feature metadata, determine that a rights defense detection result is "non-infringing".

In this embodiment, the rights defense detection service apparatus is presented in a form of a function unit. An implementation of the "unit" herein may be an application-specific integrated circuit (ASIC), a circuit, a processor and a memory that execute one or more software or firmware programs, an integrated logic circuit, and/or another device that can provide the foregoing functions. In a simple embodiment, a person skilled in the art may understand that the rights defense detection service apparatus may be in the form shown in FIG. 5. The rights defense detection service apparatus may be implemented by using the processor and the memory in FIG. 5.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate a device for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction device. The instruction device implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of this application have been described, a person skilled in the art can make changes and modifications to these embodiments once they learn the basic inventive concept. Therefore, the following claims are intended to be construed as to cover the embodiments and all changes and modifications falling within the scope of this application.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for copyright rights defense detection, comprising:
sending a metadata query request to a copyright handling apparatus, wherein the metadata query request comprises a detection task transaction identifier;
receiving a metadata query response that is sent by the copyright handling apparatus and that comprises feature metadata, wherein the feature metadata is obtained by the copyright handling apparatus based on the detection task transaction identifier, and wherein the feature metadata is obtained from a blockchain stored in a blockchain processing apparatus;
obtaining a content feature corresponding to the feature metadata from a feature database, wherein the content feature is a rights-to-be-defended content feature;
sending a license query request to a license processing apparatus, wherein the license query request comprises the detection task transaction identifier;
receiving a license query response that is sent by the license processing apparatus and that comprises license information, wherein the license information is obtained by the license processing apparatus based on the detection task transaction identifier, and wherein the license information is obtained from the blockchain stored in the blockchain processing apparatus;
performing rights defense detection for a copyright based on the obtained rights-to-be-defended content feature and the license information; and
sending a detection report submission request to a rights defense processing apparatus, wherein the detection report submission request comprises an address of a detection report asset owner, a detection report submission time, a content distribution identifier, a content feature transaction identifier of infringed content, the detection task transaction identifier, and a content feature matching degree; wherein
after receiving the detection report submission request and successfully verifying the detection report submission request, the rights defense processing apparatus constructs a detection report transaction based on the detection report submission request, sets each of a transaction identifier of a transaction currently bearing an asset and a signature of an asset owner that are in input content in the detection report transaction to be empty, sets an address in output content in the detection report transaction to the address of the detection report asset owner, and sets asset data in the output content in the detection report transaction to the detection report submission time, the content distribution identifier, the content feature transaction identifier of infringed content, the detection task transaction identifier, and the content feature matching degree; and
the rights defense processing apparatus sends the detection report transaction to the blockchain in the blockchain processing apparatus for storage.

2. The method according to claim 1, wherein the performing rights defense detection for a copyright based on the obtained rights-to-be-defended content feature and the license information specifically comprises:
receiving a detection task request sent by a rights defense detection client, wherein the detection task request comprises a content distribution identifier;
allocating a rights defense detection task to the rights defense detection client based on the content distribution identifier;
sending a detection task response to the rights defense detection client, wherein the detection task response comprises a task allocation result, a sequence number of a to-be-matched content feature segment, and a segment size;
receiving a content feature reporting request sent by the rights defense detection client, wherein the content feature reporting request comprises the content distribution identifier, a content feature extraction result, the sequence number of the to-be-matched content feature segment, and a to-be-matched content feature segment;
performing matching based on the to-be-matched content feature segment and the rights-to-be-defended content feature, to obtain a matching result; and performing, based on the license information, rights defense detection for a copyright corresponding to a to-be-matched content feature whose matching result indicates a success.

3. The method according to claim 2, wherein the allocating a rights defense detection task to the rights defense detection client based on the content distribution identifier specifically comprises:
   determining whether the content distribution identifier exists, and if the content distribution identifier does not exist, setting the sequence number of the to-be-matched content feature segment to 1, setting the segment size according to a preconfigured rule, and setting the task allocation result to successful; or
   if the content distribution identifier exists and a corresponding detection task state is in-progress, querying a maximum sequence number of an allocated to-be-matched content feature segment based on the content distribution identifier, setting the sequence number of a to-be-matched content feature segment to be equal to the maximum sequence number of an allocated to-be-matched content feature segment+1, setting the segment size according to a second preconfigured rule, and setting the task allocation result to successful; or
   if the content distribution identifier in the detection task request exists and a corresponding detection task state is ended, setting the task allocation result to ended.

4. The method according to claim 2, wherein the performing rights defense detection for a copyright based on the obtained rights-to-be-defended content feature and the license information specifically comprises:
   performing, based on the license information, rights defense detection for a copyright corresponding to a to-be-matched content feature whose matching result indicates a success.

5. The method according to claim 2, wherein the performing, based on the license information, rights defense detection for a copyright corresponding to a to-be-matched content feature whose matching result indicates a success specifically comprises:
   obtaining, based on a stored association relationship between a content feature and a content feature transaction identifier, a content feature transaction identifier corresponding to the to-be-matched content feature whose matching result indicates a success;
   obtaining, based on a stored association relationship between a content feature transaction identifier and a copyright transaction identifier, a copyright transaction identifier corresponding to the content feature transaction identifier; and
   if license information corresponding to the copyright transaction identifier is empty, determining, based on a stored correspondence between a copyright transaction identifier and license information, that a rights defense detection result is "infringing"; or if license information corresponding to the copyright transaction identifier is not empty, determining whether a distribution constraint of a license comprised in the license information is valid; and if the distribution constraint of the license is invalid, determining that a rights defense detection result is "infringing", or if the distribution constraint of the license is valid, determining that a rights defense detection result is "non-infringing".

6. The method according to claim 1, wherein the sending a metadata query request to a copyright handling apparatus specifically comprises:
   sending, by a rights defense detection service apparatus, a detection task query request to a rights defense processing apparatus, wherein the detection task query request comprises the detection task transaction identifier;
   receiving, by the rights defense detection service apparatus, a detection task query response that is sent by the rights defense processing apparatus and that comprises one or more detection task transactions, wherein the detection task transaction is obtained by the rights defense processing apparatus based on the detection task transaction identifier from the blockchain stored in the blockchain processing apparatus; and
   sending the metadata query request to the copyright handling apparatus for each detection task transaction.

7. The method according to claim 1, wherein the performing rights defense detection for a copyright based on the obtained rights-to-be-defended content feature and the license information specifically comprises:
   obtaining to-be-matched feature metadata from the blockchain processing apparatus corresponding to the copyright handling apparatus;
   obtaining a to-be-matched content feature from the feature database based on the to-be-matched feature metadata;
   performing matching based on a to-be-matched content feature segment and the rights-to-be-defended content feature, to obtain a matching result; and
   when the matching result indicates a success, determining whether a copyright transaction identifier corresponding to the to-be-matched feature metadata is the same as a copyright transaction identifier corresponding to rights-to-be-defended feature metadata; and if the copyright transaction identifier corresponding to the to-be-matched feature metadata is the same as the copyright transaction identifier corresponding to the rights-to-be-defended feature metadata, determining that a rights defense detection result is "infringing", or if the copyright transaction identifier corresponding to the to-be-matched feature metadata is different from the copyright transaction identifier corresponding to the rights-to-be-defended feature metadata, determining that a rights defense detection result is "non-infringing".

8. A copyright rights defense detection system, comprising a rights defense detection service apparatus, a copyright handling apparatus, a license processing apparatus, a plurality of blockchain processing apparatuses, and a rights defense processing apparatus; wherein
   the rights defense detection service apparatus comprises a memory configured to store instructions; at least one processor coupled to the memory, wherein the instructions, when executed by the at least one processor, cause the rights defense detection service apparatus to: send a metadata query request to the copyright handling apparatus, wherein the metadata query request comprises a detection task transaction identifier; receive a metadata query response that is sent by the copyright handling apparatus and that comprises feature metadata, wherein the feature metadata is obtained by the copyright handling apparatus based on the detection task transaction identifier and wherein the feature metadata is obtained from a blockchain stored in one of the plurality of blockchain processing apparatuses; obtain a content feature corresponding to the feature metadata from a feature database, wherein the content feature is a rights-to-be-defended content feature; send a license query request to the license processing apparatus, wherein the license query request comprises the detection task transaction identifier; receive a license query response that is sent by the license processing apparatus and that comprises license information, wherein the license information is obtained by the license processing apparatus based on the detection task transaction identifier, and wherein the license information is obtained from a blockchain stored in one of the plurality of blockchain processing apparatuses; and perform rights defense detection for a copyright based on the obtained rights-to-be-defended content feature and the license information;

the copyright handling apparatus comprises a memory configured to store instructions; at least one processor coupled to the memory, wherein the instructions, when executed by the at least one processor, cause the copyright handling apparatus to: receive the metadata query request sent by the rights defense detection service apparatus, obtain the feature metadata corresponding to the detection task transaction identifier from the corresponding blockchain processing apparatus, and send the metadata query response comprising the feature metadata to the rights defense detection service apparatus;

the license processing apparatus comprises a memory configured to store instructions; at least one processor coupled to the memory, wherein the instructions, when executed by the at least one processor, cause the license processing apparatus to receive the license query request, obtain the license information corresponding to the detection task transaction identifier from the corresponding blockchain processing apparatus, and send the license query response comprising the license information to the rights defense detection service apparatus; and each blockchain processing apparatus comprises a memory configured to store instructions; at least one processor coupled to the memory, wherein the instructions, when executed by the at least one processor, cause the blockchain processing apparatus to: store the feature metadata and the license information; and the rights defense processing apparatus receives a detection report submission request, constructs a detection report based on the detection report submission request, and sends the detection report to the blockchain in the blockchain processing apparatus for storage wherein the detection report submission request comprises an address of a detection report asset owner, a detection report submission time, a content distribution identifier, a content feature transaction identifier of infringed content, the detection task transaction identifier, and a content feature matching degree; wherein after receiving the detection report submission request and successfully verifying the detection report submission request, the rights defense processing apparatus constructs a detection report transaction based on the detection report submission request, sets each of a transaction identifier of a transaction currently bearing an asset and a signature of an asset owner that are in input content in the detection report transaction to be empty, sets an address in output content in the detection report transaction to the address of the detection report asset owner, and sets asset data in the output content in the detection report transaction to the detection report submission time, the content distribution identifier, the content feature transaction identifier of infringed content, the detection task transaction identifier, and the content feature matching degree.

9. The system according to claim 8, wherein the instructions, when executed by the at least one processor, further cause the rights defense detection service apparatus to: receive a detection task request sent by a rights defense detection client, wherein the detection task request comprises a content distribution identifier; allocate a rights defense detection task to the rights defense detection client based on the content distribution identifier; send a detection task response to the rights defense detection client, wherein the detection task response comprises a task allocation result, a sequence number of a to-be-matched content feature segment, and a segment size; receive a content feature reporting request sent by the rights defense detection client, wherein the content feature reporting request comprises the content distribution identifier, a content feature extraction result, the sequence number of the to-be-matched content feature segment, and a to-be-matched content feature segment; perform matching based on the to-be-matched content feature segment and the rights-to-be-defended content feature, to obtain a matching result; and perform, based on the license information, rights defense detection for a copyright corresponding to a to-be-matched content feature whose matching result indicates a success.

10. The system according to claim 9, wherein the instructions, when executed by the at least one processor, further cause the rights defense detection service apparatus to: determine whether the content distribution identifier exists, and if the content distribution identifier does not exist, set the sequence number of the to-be-matched content feature segment to 1, set the segment size according to a preconfigured rule, and set the task allocation result to successful; or if the content distribution identifier exists and a corresponding detection task state is in-progress, query a maximum sequence number of an allocated to-be-matched content feature segment based on the content distribution identifier, set the sequence number of the to-be-matched content feature segment to be equal to the maximum sequence number of the allocated to-be-matched content feature segment+1, set the segment size according to a preconfigured rule, and set the task allocation result to successful; or if the content distribution identifier in the detection task request exists and a corresponding detection task state is ended, set the task allocation result to ended.

11. The system according to claim 9, wherein the instructions, when executed by the at least one processor, further cause the rights defense detection service apparatus to: obtain, based on a stored association relationship between a content feature and a content feature transaction identifier, a content feature transaction identifier corresponding to the to-be-matched content feature whose matching result indicates a success; obtain, based on a stored association relationship between a content feature transaction identifier and a copyright transaction identifier, a copyright transaction identifier corresponding to the content feature transaction identifier; and if license information corresponding to the copyright transaction identifier is empty, determine, based on a stored correspondence between a copyright transaction identifier and license information, that a rights defense detection result is "infringing"; or if license information corresponding to the copyright transaction identifier is not empty, determine whether a distribution constraint of a license comprised in the license information is valid; and if the distribution constraint of the license is invalid, determine that a rights defense detection result is "infringing", or if the distribution constraint of the license is valid, determine that a rights defense detection result is "non-infringing".

12. A rights defense detection service apparatus, comprising:
a memory configured to store instructions;
at least one processor coupled to the memory, wherein the instructions, when executed by the at least one processor, cause the apparatus to:
send a metadata query request to a copyright handling apparatus, wherein the metadata query request comprises a detection task transaction identifier;
receive a metadata query response that is sent by the copyright handling apparatus and that comprises feature metadata, wherein the feature metadata is obtained by the copyright handling apparatus based on the detection task transaction identifier from a blockchain stored in a blockchain processing apparatus;
obtain a content feature corresponding to the feature metadata from a feature database;
send a license query request to a license processing apparatus, wherein the content feature is a rights-to-be-defended content feature and wherein the license query request comprises the detection task transaction identifier;
receive a license query response that is sent by the license processing apparatus and that comprises license information, wherein the license information is obtained by the license processing apparatus based on the detection task transaction identifier from a blockchain stored in a blockchain processing apparatus;
perform rights defense detection for a copyright based on the obtained rights-to-be-defended content feature and the license information; and
send a detection report submission request to a rights defense processing apparatus, wherein the detection report submission request comprises an address of a detection report asset owner, a detection report submission time, a content distribution identifier, a content feature transaction identifier of infringed content, the detection task transaction identifier, and a content feature matching degree; wherein
after receiving the detection report submission request and successfully verifying the detection report submission request, the rights defense processing apparatus constructs a detection report transaction based on the detection report submission request, sets each of a transaction identifier of a transaction currently bearing an asset and a signature of an asset owner that are in input content in the detection report transaction to be empty, sets an address in output content in the detection report transaction to the address of the detection report asset owner, and sets asset data in the output content in the detection report transaction to the detection report submission time, the content distribution identifier, the content feature transaction identifier of infringed content, the detection task transaction identifier, and the content feature matching degree; and
the rights defense processing apparatus sends the detection report transaction to the blockchain in the blockchain processing apparatus for storage.

13. The rights defense detection service apparatus according to claim 12, wherein the instructions, when executed by the at least one processor, further cause the apparatus to: receive a detection task request sent by a rights defense detection client, wherein the detection task request comprises a content distribution identifier; allocate a rights defense detection task to the rights defense detection client based on the content distribution identifier; send a detection task response to the rights defense detection client, wherein the detection task response comprises a task allocation result, a sequence number of a to-be-matched content feature segment, and a segment size; receive a content feature reporting request sent by the rights defense detection client, wherein the content feature reporting request comprises the content distribution identifier, a content feature extraction result, the sequence number of the to-be-matched content feature segment, and a to-be-matched content feature segment; perform matching based on the to-be-matched content feature segment and the rights-to-be-defended content feature, to obtain a matching result; and perform, based on the license information, rights defense detection for a copyright corresponding to a to-be-matched content feature whose matching result indicates a success.

14. The rights defense detection service apparatus according to claim 13, wherein the instructions, when executed by the at least one processor, further cause the apparatus to: determine whether the content distribution identifier exists, wherein when allocating a rights defense detection task to the rights defense detection client based on the content distribution identifier, and if the content distribution identifier does not exist, set the sequence number of the to-be-matched content feature segment to 1, set the segment size according to a preconfigured rule, and set the task allocation result to successful; or if the content distribution identifier exists and a corresponding detection task state is in-progress, query a maximum sequence number of an allocated to-be-matched content feature segment based on the content distribution identifier, set the sequence number of the to-be-matched content feature segment to be equal to the maximum sequence number of the allocated to-be-matched content feature segment+1, set the segment size according to a preconfigured rule, and set the task allocation result to successful; or if the content distribution identifier in the detection task request exists and a corresponding detection task state is ended, set the task allocation result to ended.

15. The rights defense detection service apparatus according to claim 12, wherein the instructions, when executed by the at least one processor, further cause the apparatus to: perform, based on the license information, rights defense detection for a copyright corresponding to a to-be-matched content feature whose matching result indicates a success.

16. The rights defense detection service apparatus according to claim 13, wherein the instructions, when executed by the at least one processor, further cause the apparatus to: wherein when performing, based on the license information, rights defense detection for a copyright corresponding to a to-be-matched content feature whose matching result indicates a success, obtain, based on a stored association relationship between a content feature and a content feature transaction identifier, a content feature transaction identifier corresponding to the to-be-matched content feature whose matching result indicates a success; obtain, based on a stored association relationship between a content feature transaction identifier and a copyright transaction identifier, a copyright transaction identifier corresponding to the content feature transaction identifier; and if license information corresponding to the copyright transaction identifier is empty, determine, based on a stored correspondence between a copyright transaction identifier and license information, that a rights defense detection result is "infringing"; or if license information corresponding to the copyright transaction identifier is not empty, determine whether a distribution constraint of a license comprised in the license information is valid; and if the distribution constraint of the license is invalid, determine that a rights defense detection result is "infringing", or if the distribution constraint of the license is valid, determine that a rights defense detection result is "non-infringing".

17. The rights defense detection service apparatus according to claim 12, wherein the instructions, when executed by the at least one processor, further cause the apparatus to: obtain to-be-matched feature metadata from the blockchain processing apparatus corresponding to the copyright handling apparatus; obtain a to-be-matched content feature from the feature database based on the to-be-matched feature metadata; perform matching based on a to-be-matched content feature segment and the rights-to-be-defended content feature, to obtain a matching result; and when the matching result indicates a success, determine whether a copyright transaction identifier corresponding to the to-be-matched feature metadata is the same as a copyright transaction identifier corresponding to rights-to-be-defended feature metadata; and if the copyright transaction identifier corresponding to the to-be-matched feature metadata is the same as the copyright transaction identifier corresponding to the rights-to-be-defended feature metadata, determine that a rights defense detection result is "infringing", or if the copyright transaction identifier corresponding to the to-be-matched feature metadata is different from the copyright transaction identifier corresponding to the rights-to-be-defended feature metadata, determine that a rights defense detection result is "non-infringing".

* * * * *